United States Patent
Lunner et al.

(10) Patent No.: US 11,043,210 B2
(45) Date of Patent: Jun. 22, 2021

(54) SOUND PROCESSING APPARATUS UTILIZING AN ELECTROENCEPHALOGRAPHY (EEG) SIGNAL

(71) Applicant: Oticon A/S, Smørum (DK)

(72) Inventors: Thomas Lunner, Smørum (DK); Carina Graversen, Smørum (DK); Emina Alickovic, Smørum (DK); Carlos Francisco Mendoza Lara, Smørum (DK); Andrew Segar, Smørum (DK)

(73) Assignee: OTICON A/S, Smørum (DK)

( * ) Notice: Subject to any disclaimer, the term of this patent is extended or adjusted under 35 U.S.C. 154(b) by 139 days.

(21) Appl. No.: 16/442,037

(22) Filed: Jun. 14, 2019

(65) Prior Publication Data

US 2020/0005770 A1 Jan. 2, 2020

(30) Foreign Application Priority Data

Jun. 14, 2018 (EP) .................................... 18177765
Jul. 19, 2018 (EP) .................................... 18184385

(51) Int. Cl.
*G10L 15/16* (2006.01)
*G06F 3/01* (2006.01)
(Continued)

(52) U.S. Cl.
CPC .............. *G10L 15/16* (2013.01); *G06F 3/015* (2013.01); *G06F 17/18* (2013.01); *G10L 25/06* (2013.01);
(Continued)

(58) Field of Classification Search
CPC ......... G06F 3/015; G06F 17/18; G10L 15/16; G10L 21/0272; G10L 2021/02166;
(Continued)

(56) References Cited

U.S. PATENT DOCUMENTS 5,165,008 A * 11/1992 Hermansky ............. G10L 19/06
704/262
5,251,261 A * 10/1993 Meyer ..................... G10L 19/00
704/211

(Continued)

FOREIGN PATENT DOCUMENTS

EP 3267698 A1 1/2018

OTHER PUBLICATIONS

Marzieh Haghighi, Mohammad Moghadamfalahi, Murat Akcakaya, Deniz Erdogmus, "EEG-assisted modulation of sound sources in the auditory scene", 2018, Biomedical Signal Processing and Control, vol. 39, pp. 263-270, (Year: 2018).*

(Continued)

*Primary Examiner* — Eric Yen
(74) *Attorney, Agent, or Firm* — Birch, Stewart, Kolasch & Birch, LLP

(57) ABSTRACT

There is provided a speech classification apparatus for hearing devices with electroencephalography, EEG, dependent sound processing, comprising a sound processing unit configured to capturing sound input signals from at least one external microphone and segmenting said captured sound input signals into segmented sound signals, a speech classification unit comprising a speech cepstrum calculation unit configured to calculate a speech cepstrum for each segmented sound signal, an EEG cepstrum calculation unit configured to calculate an EEG cepstrum for an EEG signal of a user's brain, a mapping unit configured to select a predetermined number of coefficients from each calculated sound cepstrum and from the calculated EEG cepstrum, and a correlation unit configured to calculate a correlation value for each captured sound input signal based on a correlation of the predetermined number of selected coefficients from the respective calculated sound cepstrum with the predetermined number of selected coefficients from the calculated (Continued)

EEG cepstrum, wherein an attended speech source is classified based on the obtained correlation values.

20 Claims, 20 Drawing Sheets

(51) Int. Cl.

| | |
|---|---|
| *G06F 17/18* | (2006.01) |
| *G10L 25/51* | (2013.01) |
| *G10L 25/06* | (2013.01) |
| *G10L 25/24* | (2013.01) |
| *G10L 25/30* | (2013.01) |

(52) U.S. Cl.
CPC .............. *G10L 25/24* (2013.01); *G10L 25/30* (2013.01); *G10L 25/51* (2013.01)

(58) Field of Classification Search
CPC ..... G10L 21/0308; G10L 25/06; G10L 25/24; G10L 25/30; G10L 25/51
See application file for complete search history.

(56) References Cited

U.S. PATENT DOCUMENTS

| | | | | |
|---|---|---|---|---|
| 6,315,414 | B1* | 11/2001 | Maddess | G06F 3/015 351/246 |
| 8,719,039 | B1* | 5/2014 | Sharifi | G10L 15/08 704/275 |
| 9,336,767 | B1* | 5/2016 | Barton | G10K 11/16 |
| 9,711,148 | B1* | 7/2017 | Sharifi | G10L 17/24 |
| 9,760,660 | B2* | 9/2017 | Spira | G06Q 10/04 |
| 2004/0208326 | A1* | 10/2004 | Behrens | H04R 25/70 381/92 |
| 2004/0230420 | A1* | 11/2004 | Kadambe | G10L 15/07 704/205 |
| 2007/0021958 | A1* | 1/2007 | Visser | G10L 21/0272 704/226 |
| 2012/0046946 | A1* | 2/2012 | Shu | G10L 15/02 704/243 |
| 2013/0243227 | A1* | 9/2013 | Kinsbergen | H04R 25/70 381/314 |
| 2013/0253917 | A1* | 9/2013 | Schildbach | G10L 19/26 704/200.1 |
| 2013/0275128 | A1* | 10/2013 | Claussen | G10L 25/78 704/233 |
| 2014/0098981 | A1* | 4/2014 | Lunner | H04R 25/50 381/320 |
| 2014/0369537 | A1* | 12/2014 | Pontoppidan | H04R 25/00 381/314 |
| 2015/0112682 | A1* | 4/2015 | Rodriguez | G10L 25/48 704/249 |
| 2015/0199974 | A1* | 7/2015 | Bilobrov | G10L 25/51 700/94 |
| 2016/0081623 | A1* | 3/2016 | Lunner | H04R 25/65 381/315 |
| 2016/0119726 | A1 | 4/2016 | Pontoppidan et al. | |
| 2016/0282940 | A1* | 9/2016 | Hong | G06F 3/1446 |
| 2018/0014130 | A1* | 1/2018 | Lunner | A61F 11/06 |

OTHER PUBLICATIONS

P. Nguyen, D. Tran, X. Huang and W. Ma, "Age and gender classification using EEG paralinguistic features," 2013, 2013 6th International IEEE/EMBS Conference on Neural Engineering (NER) pp. 1295-1298, (Year: 2013).*

Kong, YY., Somarowthu, A. & Ding, N. "Effects of Spectral Degradation on Attentional Modulation of Cortical Auditory Responses to Continuous Speech", 2015 JARO 16, 783-796 (Year: 2015).*

Keranmu Xielifuguli; Akira Fujisawa; Yusuke Kusumoto; Kazuyuki Matsumoto; Kenji Kita, "Pleasant/Unpleasant Filtering for Affective Image Retrieval Based on Cross-Correlation of EEG Features", 2014, Applied Computational Intelligence & Soft Computing, p. 1-10, (Year: 2014).*

Cantzos, D., "Statistical enhancement methods for immersive audio environments and compressed audio (Order No. 3341889).", 2008, Available from ProQuest Dissertations and Theses Professional. Retrieved from https://dialog.proquest.com/professional/docview/304468450?accountid=131444 (Year: 2008).*

Raghavan, S., "Applications of large vocabulary continuous speech recognition to fatigue detection (Order No. 1439756).", 2006, Available from ProQuest Dissertations and Theses Professional. Retrieved from https://dialog.proquest.com/professional/docview/305306406?accountid=131444 (Year: 2006).*

Carlos Francisco Mendoza & Andrew Segar, "Decoding Auditory Attention from Multivariate Neural Data using Cepstral Analysis" Jun. 2018, Department of Mathematical Statistics, Lund University (Year: 2018).*

Bhattacharyya et al., "Cepstrum Based Algorithm for Motor Imagery Classification," 2016 International Conference on Micro-Electronics and Telecommunication Engineering (ICMETE), Sep. 22, 2016, pp. 397-402, XP033104894.

Liu et al., "Multiple Feature Fusion for Automatic Emotion Recognition Using EEG Signals," 2018 IEEE International Conference on Acoustics, Speech and Signal Processing (ICASSP), Apr. 15, 2018, pp. 896-900, XP033401782.

* cited by examiner

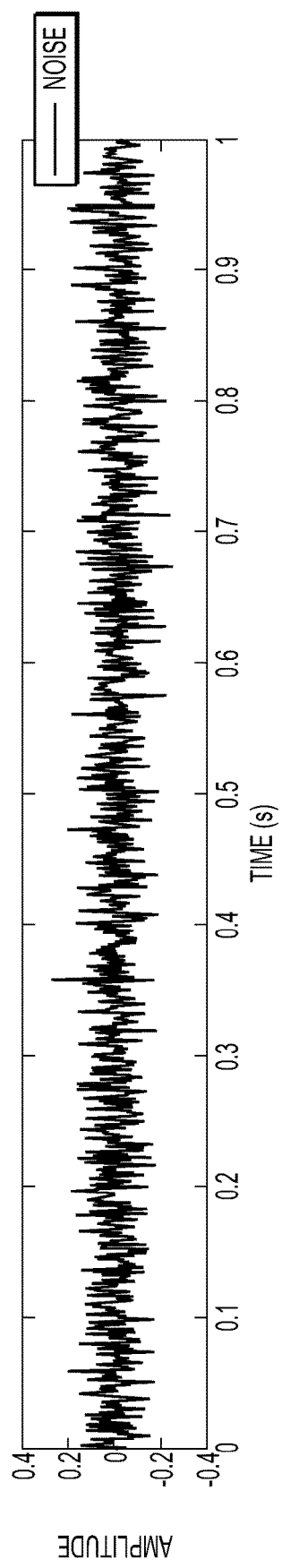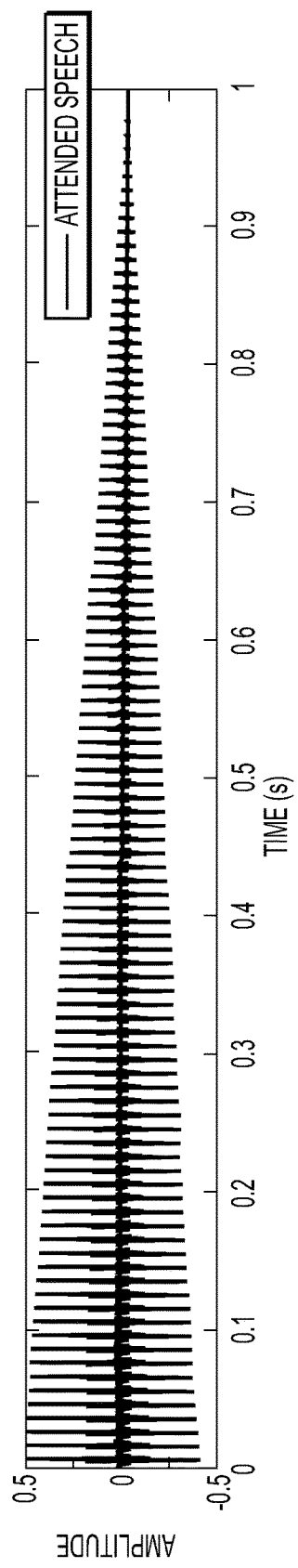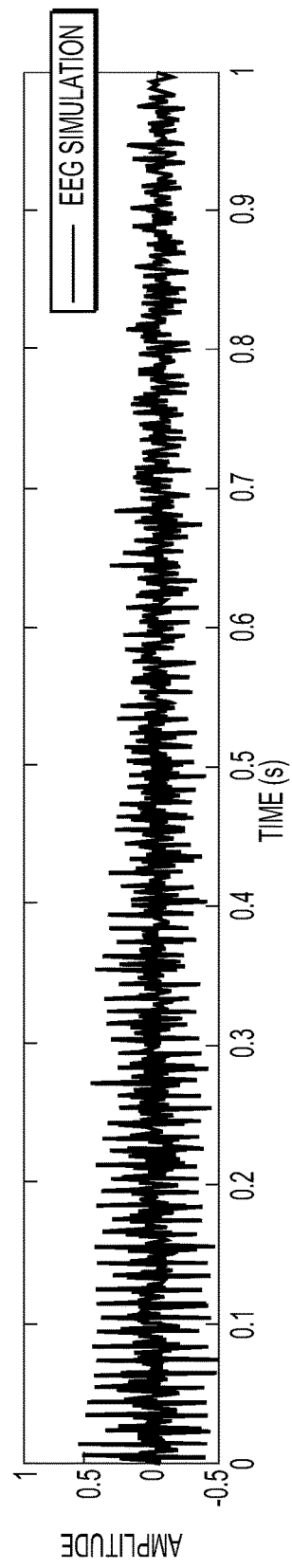

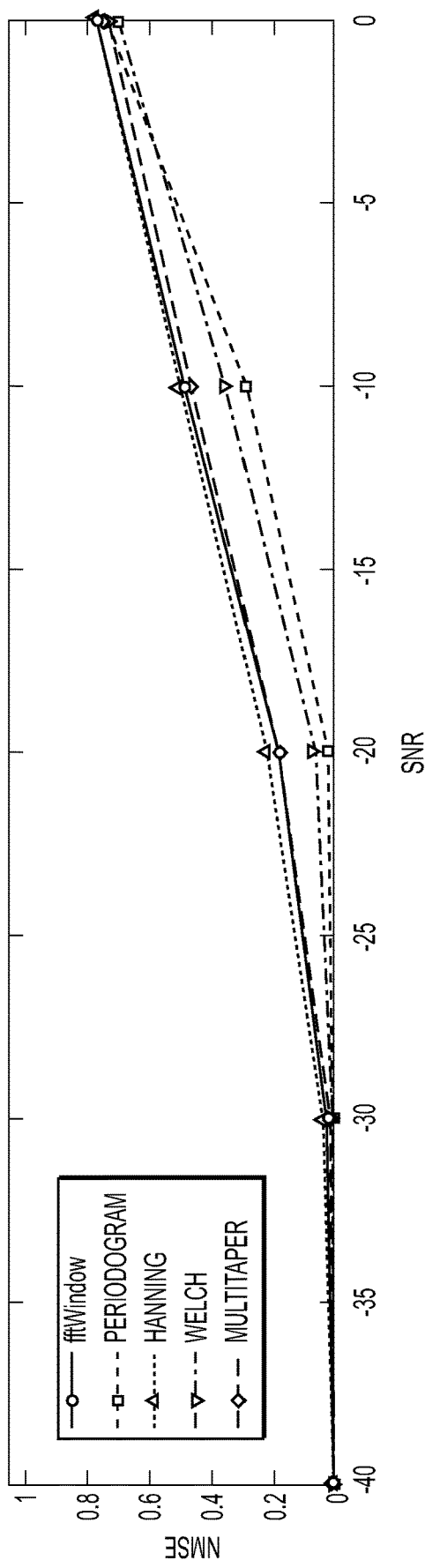
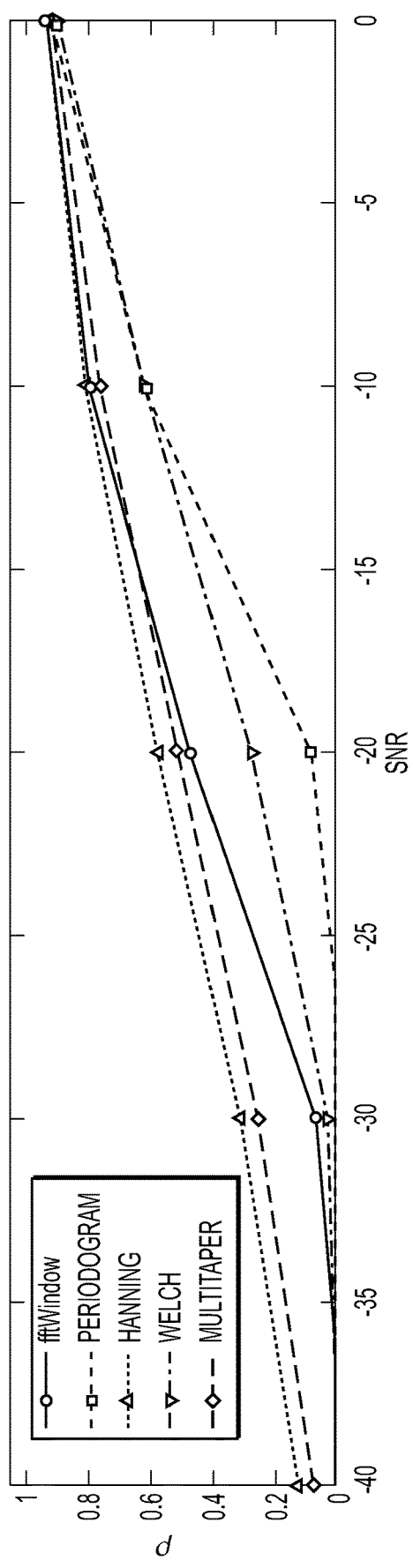
FIG. 13A
FIG. 13B

SOUND PROCESSING APPARATUS UTILIZING AN ELECTROENCEPHALOGRAPHY (EEG) SIGNAL

FIELD

The present invention relates to a sound processing apparatus for a hearing device with brainwave dependent sound processing. More specifically, the present invention relates to a hearing device such as e.g. a hearing aid, hearing instrument, a listening device, an active ear-protection device, an earphone or a headset, which has a sensor for measuring brainwaves of the hearing device's user and which adapts its sound processing in dependence on the measured brainwaves.

The invention may e.g. be useful in applications such as a hearing aid for compensating for a hearing-impaired person's loss of hearing capability, a listening device for augmenting a normal-hearing person's hearing capability, an active ear-protection device for protecting a person's auditory system, an earphone for conveying electronic sound signals to the user or a headset for communicating with another person.

BACKGROUND

A common challenge in the technical field of hearing devices is to improve the ability of the hearing-device user to focus attention on a specific speaker in a sound environment with two or more speakers, i.e. to ameliorate the so-called "cocktail-party" effect.

In "cocktail party" situations, those of us fortunate enough to have normal hearing are usually able to tune into a particular speaker with little effort. However, if there is background noise, or the listener has a hearing impairment, this can be extremely difficult. Most people with hearing impairments find it far more difficult to understand speech in noisy environments compared to speech in quiet environments. Standard hearing aids (HA) or hearing instruments (HI) are of little help to those with this type of hearing impairment as they amplify both speech and noise.

Directional hearing aids provide increases in the signal-to-noise-ratio (SNR) which improves comprehension. However, in general directional hearing aids are designed to reduce sounds that are not directly in front of the listener, which creates limitations. Data has shown that listeners need to face the signal of interest and be within a certain distance to obtain directional benefit. Also, noise should either surround, or be directly behind, the listener.

In a cafe or restaurant, there are often multiple speakers surrounding the listener, only one of which they would like to attend to in a given moment. There is also often background noise coming from a specific direction rather than surrounding or from directly behind the listener. One of the goals of current research is to use electroencephalogram (EEG) signals to create a brain-computer interface (BCI) system. This system would be able to decide which sound source a listener is attending to, and then steer the directional microphones and/or suppress noise.

EEG signals are a measure of changes in the electrical potential on the surface of the scalp. The first experiments investigating EEG responses to auditory stimuli found that the EEG response reflected auditory neural processing of simple tone pips. Following this, experiments using speech carried out in the 1970s showed that linguistic features such as the semantic meaning of words and the sentence context affect the neural processing of speech.

It is known in the prior art that neural activity of a user's brain follows the speech envelope, and several highly performing, speech tracking linear regression, LR, methods are known. One such method, referred to as the stimulus reconstruction, SR, is used in (1) the reconstruction of the stimulus envelope from the recorded neural response, and (2) classification of the attended speech in a multi-talker listening environments, by using an inverse mapping from EEG to sound data.

In this method, SR, the reconstructed stimulus is compared to a real stimulus, and a reconstruction accuracy is quantified in terms of correlation coefficient (Pearson r). The reconstruction accuracy is a measure of the neural entrainment of the speech. Stimulus reconstruction can also be used to design a classifier, by comparing the correlations between reconstructed speech envelope and the actual available speech envelopes. The speech envelope with the highest correlation value is classified as attended speech.

However, correlation coefficients for EEG data that have been achieved so far are typically on the order of $r=0.1$-$0.2$, which is very low. This is mainly due to the facts that (1) EEG signals reflect different brain processes, in addition to the selective attention task, and only a part of EEG variance can be predicted from the speech, and (2) some speech features do not impact the perception or evoked neural responses.

In addition, also forward models have been considered, with the results showing low correlations between the actual and reconstructed signals.

Further, it was proposed to use a combination of encoding and decoding, and to use a canonical correlation analysis (CCA) in parameter optimization. The correlation coefficients in CCA are significantly larger when compared to those for forward and backward models, and about $r=0.1$-$0.4$ for a single-talker listening environment.

In general, the approaches found in the current literature rely solely on mapping the extracting spectro-temporal speech envelope to the (temporal) neural data via LR.

The main shortcomings of the techniques in the prior art is low performance in terms of reconstruction accuracy (correlation coefficients), but also in terms of classification accuracy. That is, in the prior art, there is no method that can reliably map speech to EEG data, i.e., a method which can give high reconstruction accuracy (correlation coefficients). Furthermore, in the prior art, there is no classification accuracy close to 100% so far.

Hence, there is a need for a highly accurate encoding and classification scheme of an attended source, given sound signals and EEG (electroencephalography) input signals.

There is a need to provide a solution that addresses at least some of the above-mentioned problems, while further there is a need for alternative ways of extracting features from speech and sound signals and EEG data, and thus, a different view on how to define a mapping between EEG and sound data and how to define a regression model, so as to solve this problem.

SUMMARY

According to an aspect, there is provided a speech classification apparatus for hearing devices with electroencephalography, EEG, dependent sound processing, comprising a sound processing unit configured to capturing sound input signals from at least one external microphone and segmenting said captured sound input signals into segmented sound signals, a speech classification unit comprising a sound cepstrum calculation unit configured to calculate a sound cepstrum for each segmented sound signal, an EEG cepstrum calculation unit configured to calculate an EEG cepstrum for an EEG signal of a user's brain, a mapping unit configured to select a predetermined number of coefficients from each calculated sound cepstrum and from the calculated EEG cepstrum and a correlation unit configured to calculate a correlation value for each captured sound input signal based on a correlation of the predetermined number of selected coefficients from the respective calculated sound cepstrum with the predetermined number of selected coefficients from the calculated EEG cepstrum wherein an attended speech source is classified based on the obtained correlation values.

This allows for providing a new way of extracting features from speech and sound signals and EEG data, and thus, a different view on how to define a mapping between EEG and sound data, in order to solve the problem of the invention. Further, this provides for highly accurate encoding/decoding and classification of attended source, given sound signal and EEG signal input.

In one embodiment, the EEG signal is provided by an EEG device configured to record an activity of the auditory part of the user's brain.

In one embodiment, the sound cepstrum calculation units is configured to calculate the cepstrum of the sound input signal and the EEG cepstrum calculation unit is configured to calculate the cepstrum of the EEG signal by calculating a real number of an inverse Fourier transform of a logarithmized power spectrum of the respective sound and EEG input signal.

In one embodiment, the sound processing unit comprises a pre-processing unit, wherein the sound pre-processing unit (101) is configured to delay each of the sound input signals (11) by a predetermined time, or the EEG cepstrum calculation unit comprises a pre-processing unit, wherein the EEG pre-processing unit is configured to delay the EEG input signal by a predetermined time.

In one embodiment, the correlation unit is configured to calculate the correlation value for each segmented sound signals using a linear regression method, a non-linear regression method, or using a neural network.

In one embodiment, the correlation unit is configured to identify the selected sound input signal, which the user is listening to, based on the sound and EEG correlation values.

According to another aspect, a hearing assistance system for hearing devices with electroencephalography, EEG, dependent sound processing, comprising one or two hearing devices, each hearing device being adapted for being located at or in an ear or for being fully or partially implanted in the head of the user, each hearing device comprising an output unit for providing output stimuli perceivable by the user as sound, wherein at least one of the hearing devices comprises the speech classification apparatus as described above, the at least one hearing device is configured to provide the EEG input signal by at least one EEG electrode, and the output stimuli are based on the correlation values calculated by the correlation unit.

In one embodiment, the at least one hearing device comprises a hearing aid, a headset, an earphone, an ear protection device, a speakerphone or a combination thereof.

In one embodiment, the system comprising a first hearing device and a second hearing device, wherein the hearing assistance system is configured to allow the exchange of information between the first and second hearing devices or between the first and second hearing devices and an auxiliary device.

According to yet another aspect, a speech classification method for hearing devices with electroencephalography, EEG, dependent sound processing is provided. The method comprising capturing one or more sound signals from at least one external microphone and segmenting said captured sound input signals into segmented sound signals, capturing an EEG signal of a user's brain, calculating a cepstrum for each captured sound signal and EEG signal, selecting a predetermined number of coefficients from each calculated sound cepstrum and from the calculated EEG cepstrum, calculating a correlation value for each captured sound input signal based on a correlation of the predetermined number of selected coefficients from the respective calculated sound cepstrum with the predetermined number of coefficients selected from the calculated EEG cepstrum and classifying an attended speech source based on the obtained correlation values.

In one aspect, a pre-processing step is performed before the cepstrum calculation step comprising delaying the segmented sound signals by a predetermined time by the sound cepstrum calculation unit, or the EEG input signal by a predetermined time by the EEG cepstrum calculation unit.

In one embodiment, the EEG signal is provided by an EEG device configured to record an activity of the auditory part of the user's brain.

In one embodiment, the calculating step of the sound cepstrum and the EEG cepstrum comprises calculating a real number of an inverse Fourier transform of a logarithmized power spectrum of the respective signal.

In one embodiment, the method further comprising delaying the segmented sound signals by a predetermined time by the sound cepstrum calculation unit, or the EEG input signal by a predetermined time by the EEG cepstrum calculation unit.

In one embodiment, the calculating step of the correlation value, further comprising that the predetermined number of coefficients selected from each sound cepstrum is correlated with the predetermined number of coefficients selected from the EEG cepstrum using a linear regression method, a non-linear regression method, or using a neural network.

In one embodiment, the method further comprises the step of identifying the selected sound input signal, which the user is listening to, based on the sound and EEG correlation values.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out.

Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 12 a-c illustrates a graphical view of a simulation according to an embodiment of the disclosure;

FIG. 13 a-b illustrates a graphical view of a simulation according to an embodiment of the disclosure;

DETAILED DESCRIPTION

Figure 1A:
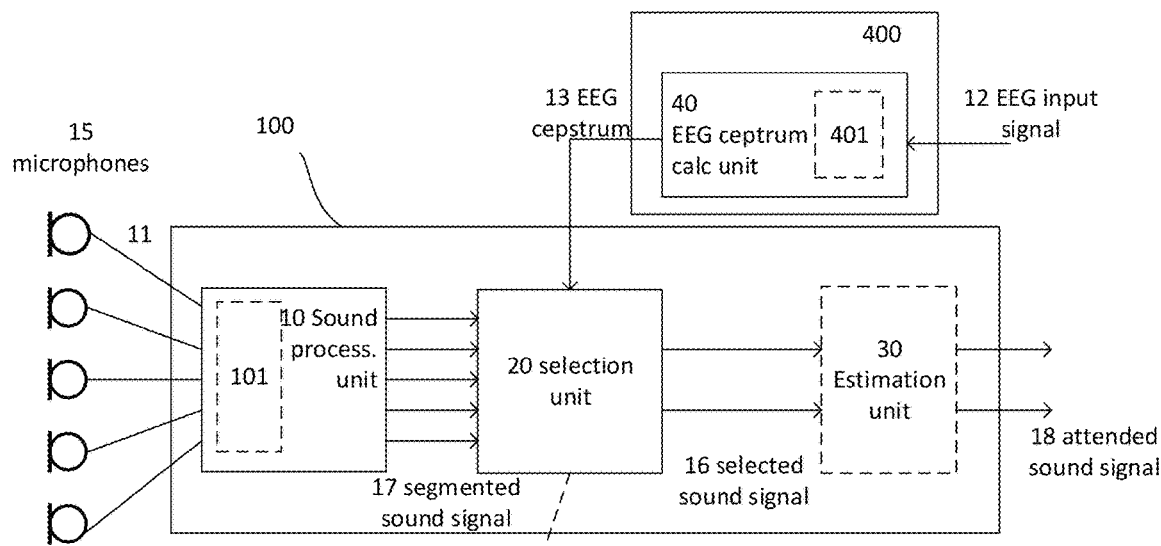
FIG. 1a-b illustrates a device according to an embodiment of the disclosure.

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In one aspect, a hearing device include a hearing aid that is adapted to improve or augment the hearing capability of a user by receiving an acoustic signal from a user's surroundings, generating a corresponding sound signal, possibly modifying the sound signal and providing the possibly modified sound signal as an audible signal to at least one of the user's ears. The "hearing device" may further refer to a device such as an earphone or a headset adapted to receive a sound signal electronically, possibly modifying the sound signal and providing the possibly modified sound signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include (i) arranging a unit of the hearing device behind the ear with a tube leading air-borne acoustic signals into the ear canal or with a receiver/loudspeaker arranged close to or in the ear canal such as in a Behind-the-Ear type of hearing aid, and/or (ii) arranging the hearing device entirely or partly in the pinna and/or in the ear canal of the user such as in an In-the-Ear type of hearing aid or In-the-Canal/Completely-in-Canal type of hearing aid, or (iii) arranging a unit of the hearing device attached to a fixture implanted into the skull bone such as in Bone Anchored Hearing Aid or Cochlear Implant, or (iv) arranging a unit of the hearing device as an entirely or partly implanted unit such as in Bone Anchored Hearing Aid or Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include auxiliary device(s) that communicates with at least one of the hearing devices, the auxiliary device affecting the operation of the hearing devices and/or benefiting from the functioning of the hearing devices. A wired or wireless communication link between the at least one hearing device and the auxiliary device is established that allows for exchanging information (e.g. control and status signals, possibly sound signals) between the at least one hearing device and the auxiliary device. Such auxiliary devices may include at least one of remote controls, remote microphones, sound gateway devices, mobile phones, public-address systems, car sound systems or music players or a combination thereof. The sound gateway is adapted to receive a multitude of sound signals such as from an entertainment device like a TV or a music player, a telephone apparatus like a mobile telephone or a computer, a PC. The sound gateway is further adapted to select and/or combine an appropriate one of the received sound signals (or combination of signals) for transmission to the at least one hearing device. The remote control is adapted to control functionality and operation of the at least one hearing device. The function of the remote control may be implemented in a Smartphone or other electronic device, the Smartphone/electronic device possibly running an application that controls functionality of the at least one hearing device.

Figure 2:
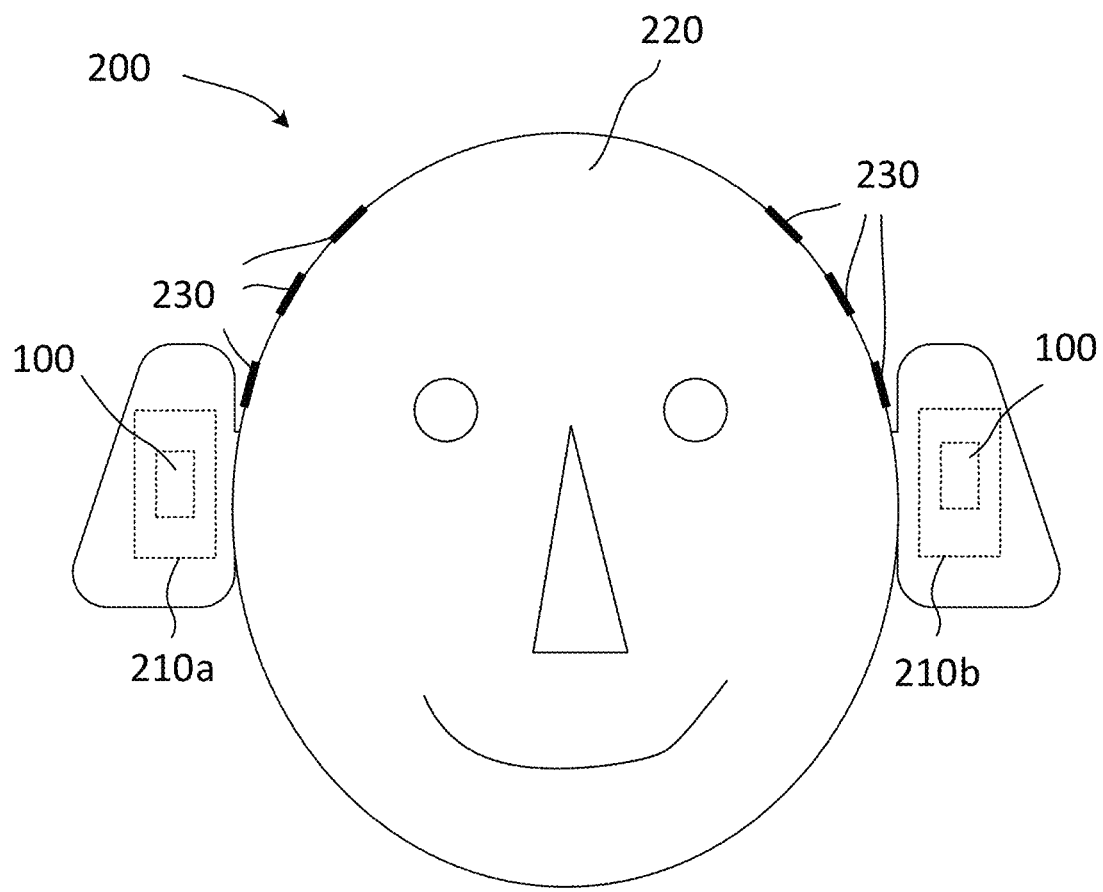
FIG. 2 illustrates a system according to an embodiment of the disclosure.

In general, as shown in FIG. 2, a hearing device 210a, 210b includes (i) an input unit 15 such as at microphone for receiving an acoustic signal from a user's surroundings and providing a corresponding input sound signal 11, and/or ii) a receiving unit for electronically receiving the input sound signal. The hearing device further includes a signal processing unit 10 for processing the input sound signal and an output unit for providing an audible signal to the user 220 in dependence on the processed sound signal.

In one aspect, the input unit 15 include multiple input microphones, e.g. for providing direction-dependent sound signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This could be achieved by using conventionally known methods. The signal processing unit include amplifier, not shown, that is adapted to apply a frequency dependent gain to the input sound signal. The signal processing unit is adapted to provide other relevant functionality such as compression, noise reduction, etc. The output unit include an output transducer, not shown, such as a loudspeaker/receiver for providing an air-borne acoustic signal transcutaneously or percutaneously to the skull bone or a vibrator for providing a structure-borne or liquid-borne acoustic signal. In some hearing devices, the output unit include one or more output electrodes for providing the electric signals such as in a Cochlear Implant.

Mathematically, we can define an analogue signal as a function that varies in continuous time, x(t). Sampling this continuous signal, x(t), with a sampling period T, we obtain a discrete-time signal, or digital signal, which can be defined as x[n]=x(nT). Note the use of square brackets and the time-index n for the digital signal, as opposed to the curved brackets and t used for the analogue signal. This convention is used throughout this text to distinguish between discrete and continuous signals. The sampling frequency can be defined as F=1/T. Throughout this text Hertz (Hz) will be used, where 1 Hz corresponds to a sampling frequency of 1 sample per second, and a sampling period of 1 second.

With the application of sound energy, air molecules alternate between compression and rarefaction along the path of the energy source. This is often represented by the graph of a sine wave. This representation of sound as an acoustic wave is how speech is usually represented.

In one aspect, as shown in FIG. 2, the EEG signals is captured by one or more electrodes 230 adapted to detect electric brain potentials of the user 220, especially the auditory part of the user's brain. The electrodes are implanted or otherwise affixed to the body of the user. An EEG measurement circuit 400 (electroencephalography device, EEG device) is provided to determine and to record one or more EEG signals from electric signals received by the electrode(s).

An EEG signal is a measurement of electrical currents that flow during synaptic excitations in the cerebral cortex. These electrical currents generate an electric field over the user's head that can be measured using EEG systems. EEG signals are recorded using multiple-electrodes placed either inside the brain (electrocorticogram), over the cortex under the skull (intracranial signals), or certain locations over the scalp of the user. Scalp EEG is non-invasive and is the type of EEG signal used in the present invention. Any further reference to EEG is referring to scalp EEG signals. The statistics of speech and EEG signals, such as the mean and variance, do not remain stable over time. As such these signals are generally non-stationary. However, they are quasi-stationary, that is, they can be considered stationary within short time intervals.

Speech recorders commonly sample at a rate of 8 kHz to 11 kHz.

Neural signals effectively range from 0.5 Hz to 50 Hz. Based on their frequency ranges, they have been grouped into five major categories: Delta (0.5 Hz to 4 Hz), Theta (4 Hz to 8 Hz), Alpha (8 Hz to 12 Hz), Beta (12 Hz to 30 Hz), and Gamma (above 30 Hz, mainly up to 45 Hz). Sometimes, the neural signal is filtered to consider only specific ranges. However, in the present invention, all frequencies of the EEG are retained.

Since EEG signals has lower frequency than speech, it follows that the sampling rate used can be lower whilst retaining the information of the signal. The sampling rate for EEG typically is around 512 Hz, however, can also be set to different frequencies depending on the required resolution and speed of the process.

In detail, the main disadvantages of the techniques in the prior art are low performance, in terms of the reconstruction accuracy (correlation coefficients), but also in terms of the classification accuracy. That is, in the prior art, there is no method that can reliably map speech signals to EEG signals, i.e., a method which can give high reconstruction accuracy (correlation coefficients).

One explanation for such low performance is a lack of representation, which can describe EEG-sound relations sufficiently well. The techniques in the prior art that extract the speech envelope do not reflect the shape of the vocal tract of the speaker including tongue, teeth, etc., which determine what sound comes out. If the shape of the vocal tract of the speaker can be determined more precisely, a more accurate representation of the phoneme can be achieved.

Hence, it is an object of the invention to identify the one sound source from the one or more sound sources that the user currently listens to.

The present disclosure thus provides a way of extracting features from sound/speech signals and EEG signals and mapping sound/speech signals with EEG signals, as well as a regression model, in order to solve the above-mentioned problem.

Cepstral Processing aims at extracting the components which can describe the linguistic content with a high fidelity and discard the irrelevant features. Cepstral processing learning can reach high performance in speech recognition. Cepstral processing is used to extract spectra-envelope based speech recognition features from EEG signals. Hence, cepstral processing is applied to describe the envelope-spectral-based speech features from both, sound data and EEG signals, so as to obtain a more robust mapping between sound/speech signals and EEG signals.

The definition of a cepstrum is based on the power spectrum of an analog signal. However, the application of the cepstrum using modern computing techniques requires digital processing and thus a clear definition of the cepstrum in terms of discrete-time signal theory is required. For discrete-time signals, the cepstrum is thus defined as the inverse discrete-time Fourier transform, IDTFT, of the logarithm of the DTFT of the signal.

In the present disclosure, the cepstrum analysis is used to model relevant linguistic content from sound signals and EEG signals. That is, cepstrum analysis is not only used to extract the linguistic content from speech signals, but also to model EEG signals, since the sound/speech signals is present in the EEG signals. By using cepstral analysis, relevant speech content from the recorded EEG measurements can be uncovered, so to obtain high correlation scores (reconstruction accuracy) in the first step, and to classify the attended speech from the obtained correlation scores.

Figure 1B:
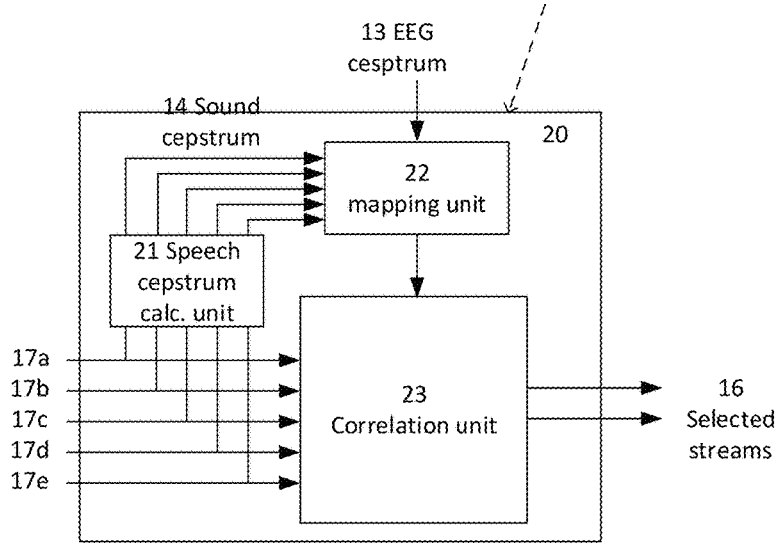

In other words, according to an embodiment of the invention, as shown in FIG. 1a-b, a speech classification apparatus 100 for hearing devices with electroencephalography (EEG) dependent sound processing is provided comprising an audio processing unit 10 configured to capturing sound input signals 11 from at least one external microphone 15 and segmenting the captured sound input signals into segmented sound signals 17, a speech classification unit 20 comprising a sound cepstrum calculation unit 21 configured to calculate a sound cepstrum 14 for each segmented sound signal 17, an EEG cepstrum calculation unit 40 configured to calculate an EEG cepstrum 13 for an EEG signal 12 of a user's brain 220, a mapping unit 22 configured to select a predetermined number of coefficients from each calculated sound cepstrum 14 and from the calculated EEG cepstrum 13, and a correlation unit 23 configured to calculate a correlation value for each captured sound input signal 11 based on a correlation of the predetermined number of selected coefficients 13, 14 from the respective calculated sound cepstrum with the predetermined number of selected coefficients from the calculated EEG cepstrum, wherein an attended speech source is classified based on the obtained correlation values.

Cepstral analysis is used to capture relevant information about vocal tract components, so as to extract features from speech and EEG signals with high fidelity, since the sound signals are correlated with EEG signals.

In the present invention, cepstral processing is used to establish a connection between the cepstral coefficients of a speech signal and the cepstral coefficients of an EEG signal. By learning about the connections between the EEG cepstral features and the sound signal cepstral features through a correlation analysis, such as for example a linear regression analysis, it is possible to uncover a representation of the sound signals (speech) in the EEG signals in a training phase, and use this knowledge to accurately reconstruct the speech from EEG during at a testing phase with high fidelity, that is a high correlation between the reconstructed and actual speech signals can be achieved. By learning to reconstruct speech from EEG data from the common feature space, the present invention used the acquired knowledge to interpret new incoming sound signals and EEG signals, in order to reconstruct the input speech streams and identify the speech stream with highest accuracy.

According to the invention, the following approach is used for the reconstruction and classification of the attended speech in a multi-talker listening environment. Cepstrograms are calculated, that is, cepstral coefficients of the sound signals and the EEG signals are respectively calculated over short time frames of a length of preferably 25 ms to 100 ms for each of these frames, and the first few coefficients are selected S350 and retained. Let $cc_{speech}(i,j)$ and $cc_{EEG}(i,j)$ indicate the j-th cepstral coefficient of the i-th frame of the speech and EEG signals, respectively. Next, these EEG frames are mapped to sound frames using a linear or a non-linear regression such as e.g. deep neural networks, for learning the impulse response of the user's brain to speech.

According to the present invention time-frequency features are extracted also from EEG signals, EEG cepstrum, which allows to provide a higher resolution of the EEG signals. Thus, relevant speech features, which are represented in the EEG data, can be identified.

During a training phase, the mapping teaches a deeper structure of the sound signals and the EEG signals, and thus provides a great knowledge about how the speech signals are represented in the user's brain.

In a testing phase, cepstrum features of the EEG signals are calculated, and the mapping acquired in the training phase is used to predict the cepstrograms of the attended speech.

To assess the performance of this reconstruction, the reconstructed cepstrogram is correlated with the cepstrogram of the actual attended speech. However, in the testing phase of the classification task, it is not known which of the available sound signals the listener attends to, and thus it has to be assessed, which of the sound cepstrograms is best correlated to the reconstructed cepstrogram, and hence, that speech can be classified as the attended speech stream.

A schematic diagram of the sound/speech classification device 100 according to the invention is shown in FIG. 1a-b and described in the following.

One or more sound input signals 11 (number n of signals, n being a positive integer larger than zero) together with an EEG signal 12 are input to the speech classification apparatus 100. The speech classification apparatus 100 includes a sound processing unit 10 including a beamforming calculation unit, a selection unit 20, and as an option an estimation unit 30. The sound processing unit 10 may further include means for pre-processing 101 the sound input signals.

The selection unit 20 comprises a speech cepstrum calculation unit 21, a mapping unit 22 and a correlation unit 23, as shown in FIG. 1b. The speech cepstrum unit 21 calculates a speech cepstrum (cepstral coefficients) from each segregated sound signal 17a-e. That is, the inverse discrete-time Fourier transform (IDTFT) of the logarithm of the discrete-time Fourier transform (DTFT) of the segregated sound signal 17a-e is calculated.

Before the cepstrum calculation in the sound cepstrum calculation unit 21, the sound signals 11 may be pre-processed by a pre-processing unit 101, as shown in FIG. 1a, which includes one or more of filtered, delayed, synchronized, re-sampled, or parsed as appropriate for the speed and resolution performance of the signal processing. In one embodiment, the pre-processing unit 101 includes a filtering element and/or a segregation element and is configured to pre-process the audio or sound input signals 11 before the cepstrum calculation step. The filtering element is configured to filter the input signal 11 and the segregation element is configured to segregate the filtered audio or sound signal into segregated sound signals 17a-e. There are several filtering alternatives, such as using a Multi-Channel Wiener Filter (MWF) or a Deep Neural Network (DNN).

Furthermore, a windowing function such as a Hanning window, Hamming window, Flat-top window, Blackman-Harris window, rectangular window, or another known window function may be applied to the segregated sound signals 17a-e. Preferably, a Hanning window is applied to the segregated sound signals 17a-e.

In other words, the sound cepstrum unit 21 is configured to calculate a cepstrum for each of the respective segregated input signal 17 a-e by calculating a real number of an inverse Fourier transform of a logarithmized power spectrum of each segregated input signal 17a-e.

It is noted that for the calculation of the DTFT, the complex logarithm function is used. However, the cepstrum that is calculated by the sound cepstrum calculation unit 21 is the real part of the complex cepstrum that is the real cepstrum or simply cepstrum in the following.

The real cepstrum differs from the complex cepstrum by the fact that the logarithm of the magnitude of the spectrum is taken rather than the complex logarithm. Typically, the real cepstrum is the used in speech technology and as such, only the real cepstrum is considered in this description, that is, cepstrum in the context of this description refers to the real cepstrum.

It is noted that also several EEG signals 12 may be input to the sound/speech classification device 100, in which case an EEG signal cepstrum and a correlation mapping as described below has to be calculated for each EEG signal 12. In one embodiment the EEG signal 12 is provided by an EEG device configured to record an activity of the auditory part of the user's brain.

The EEG cepstrum calculation unit 40 calculates a cepstrum from the EEG signal 12. That is, the inverse discrete-time Fourier transform (IDTFT) of the logarithm of the discrete-time Fourier transform (DTFT) of the EEG signal 12 is calculated.

Before the EEG cepstrum calculation, the EEG signal may be pre-processed by a pre-processing unit 401, as shown in FIG. 1*a*, which includes one or more of filtered, delayed, synchronized, re-sampled, and parsed as appropriate for the speed and resolution performance of the signal processing, while furthermore, a windowing function such as a Hanning window, Hamming window, Flat-top window, Blackman-Harris window, rectangular window, or another known window function may be applied to the EEG signal 12. Preferably, the same window function that is applied to the sound signals 11 is also applied to the EEG signals 12.

For example, cepstral coefficients of the one or more sound signals 11 and the EEG signal 12 are respectively calculated for each short time frame preferably having a length of 5 ms to 1000 ms, and more preferably having a length of 25 ms to 100 ms. However, the invention is not limited to these in time lengths, and longer signal frames or shorter signal frames may be used for the calculation of the cepstral coefficients.

Typically, the predetermined delays are determined at the time of manufacturing or at the time of adapting a hearing instrument for a certain user.

The resulting cepstra (the sound signal cepstrum and the EEG signal cepstrum) are then output from the sound cepstrum calculation unit 21 and the EEG cepstrum calculation unit 40 to the mapping unit 22, respectively.

The mapping unit 22 selects a predetermined number of cepstral coefficients from each calculated sound cepstrum as well as from the calculated EEG cepstrum (speech recognition features), wherein the cepstral coefficients are discrete values calculated by the sound cepstrum calculation unit 21 and the EEG cepstrum calculation unit 40.

For example, the first cepstral coefficients may be selected, while the first value at 0 $Hz^{-1}$ may be omitted. However, any number of cepstral coefficients may be selected, or also a set of non-consecutive cepstral coefficients may be selected, depending on a speed and a mapping resolution that the speech classification device 100 is required to achieve.

However, it is noted that the same predetermined number or the same set of coefficients is selected throughout the speech classification device 100. For example, if the first cepstral coefficients are selected from the first sound signal cepstrum, then also the first cepstral coefficients are selected from the second sound signal cepstrum, and so on, while also the first cepstral coefficients are selected from the EEG signal cepstrum.

The selected cepstral coefficients are then output from the mapping unit 22 to the correlation unit 23.

The correlation unit 23 calculates correlation values 13 describing the correlation of each speech signal cepstrum with the EEG signal cepstrum. The correlation unit 23 is configured to calculate the correlation value for each segmented sound signals 17*a*-*e*. The correlation values can be calculated using the Normalised Mean Square Error (NMSE) and Pearson correlation coefficient ($\rho$) values.

However, the invention is not limited to using NMSE and Pearson's correlation coefficient values when calculating the correlation values, but also other correlation methods e.g. linear regression methods, non-linear regression methods, or e.g. neural networks may be used.

The NMSE provides a measure of how close the cepstral coefficients from the sound signal cepstra 14 are to the cepstral coefficients of the EEG cepstrum 13. The NMSE provides values in the interval ($-\infty$,1], the value 1 being a perfect match and zero meaning there is no difference between the fitted sequence and a straight line. Negative values describe an anti-correlation of the respective cepstrum signals. In order to measure the linear correlation between the selected cepstral coefficients of two signals, Pearson's correlation value $\rho$ can be used.

In one embodiment, the correlation unit is configured to identify the selected sound input signal 16, which the user is listening to, based on the sound and EEG correlation values. The calculated correlation values for each sound input signal 11 represent a measure of the correlation of each sound input signal 11 with the EEG input signal 12. That is, the calculated correlation values allow identifying one sound input signal from the one or more other sound input signals, having a highest correlation value. The one sound input signal represents the so-called attended sound signal or attended speech, that is, the sound signals to which the user currently listens to.

The calculated correlation values are subsequently output from the speech classification apparatus 100 to allow further processing by units external to the sound processing apparatus 100.

In one embodiment, a speech classification apparatus 100 is provided according to FIG. 1*a*, which additionally to the embodiment described before provides an additional estimation unit 30.

The estimation unit 30 receives the calculated correlation values from the correlation unit 23. From the received correlation values, the estimation unit 30 can identify the one sound signal 11 the user listens to, the attended sound signal, based on the calculated correlation values, and hence outputs an identification value, which allows identifying the attended sound signal 18.

In other words, the speech classification apparatus 100 additionally comprises an estimation unit 30 configured to indicate the sound signal 11 of the one or more sound signals 11, the EEG signal 12 is indicative of based on the correlation values.

The output of the estimation unit 30 (the identification value) may be used in further components of e.g. a hearing aid as described further below.

In one embodiment, as shown in FIG. 2, a hearing assistance system 200 including at least one hearing aid 210*a*, 210*b* and a speech classification apparatus 100 is provided. The cepstrum correlation with EEG input signal 12 (or EarEEG) is used to select which of the incoming audio streams or sound input signals 11 the user is listening to.

Different embodiments of incoming audio streams or sound input signals 11 are generated either via multi-channel beamforming, as independent streamed sources 15, or via remote microphones close to the individual sources.

Alternative of sources 15 transmitting audio streams or sound input signals, Independent streaming sources, streaming via wired or wireless links:
  Single microphones;
  Mobile phone; or
  Entertainment device, e.g. a TV/media device
Remote microphones:
  FM microphone; or
  Telecoil microphones
Hearing aid (HA) microphones, e.g. beamforming sources
  Single HA with two or more directional microphones;
  Dual HA, each with two or more directional microphones;
  N microphones ($M_1, M_2, \ldots, M_N$), e.g. a microphone array configuration, mounted on a spectacle frame and associated with at least one HA, e.g hearing glasses; or
  N locally distributed microphones in the environment of the user of the hearing aid One or more speech envelope is extracted from each individual speech stream. Estimates of speech envelopes (speech envelopes reconstructed via EEG) is generated from the EEG signal via the methods called stimulus reconstruction. If the speech envelope is known for two separated speech streams (but listening to the mixture), the reconstructed attended envelope (from EEG) with the highest correlation between of "speech envelope 1" and "speech envelope 2" classifies the attended or selected stream(s) 16, 18. Given this classification, the attended/selected independent stream (beam formed, streamed, remote microphone) can then be enhanced or amplified in an amplifier and the unattended stream can be attenuated.

In the following a stimulus-reconstruction approach is described at first, which can be used in the correlation unit 23 or in the estimation unit 30 in order to calculate the correlation values and/or the identification value.

The stimulus-reconstruction approach reconstructs an estimate of an input stimulus S (sound signals 11) using a response R (EEG signal 12) is through a linear reconstruction model g. Hence, a function that describes the way the neural response is mapped onto the stimulus can be modelled.

Stimulus-reconstruction is a type of a linear time-invariant method, and although the human brain is not a linear system, it can be modelled as one with good results.

A reconstruction model g ($\tau$, n) representing a linear mapping from a neural response r (t, n) to a stimulus s(t) can be written as $$\hat{s}(t) = \sum_n \sum_\tau g(\tau, n) r(t - \tau, n), \quad \text{(eq. 1)}$$

where $\hat{s}$ is the reconstructed stimulus, t is a point in time, $\tau$ is the lag (in time points), and n is the EEG channel number. In the following, the case of several EEG signals is considered.

The function g is estimated by minimising the mean square error between s(t) and $\hat{s}(t)$ $$\min e = \min \sum_t [s(t) - \hat{s}(t)]^2 \quad \text{(eq. 2)}$$

This is found using the following equation:

$$g = (R^T R)^{-1} R^T s \quad \text{(eq. 3)}$$

where R is the lagged time series of the response matrix, r. For a single-channel response system, R is defined as:

$$R = \begin{bmatrix} r(1-\tau_{min}, 1) & r(-\tau_{min}, 1) & \cdots \\ \vdots & \vdots & \cdots \\ \vdots & \vdots & \cdots \\ \vdots & \vdots & \cdots \\ r(T, 1) & \vdots & \cdots \\ 0 & r(T, 1) & \cdots \\ \vdots & \vdots & \cdots \\ 0 & 0 & \cdots \\ r(1, 1) & 0 & \cdots & 0 \\ \vdots & r(1, 1) & \cdots & \vdots \\ \vdots & \vdots & \cdots & 0 \\ \vdots & \vdots & \cdots & r(1, 1) \\ \vdots & \vdots & \cdots & \vdots \\ \vdots & \vdots & \cdots & \vdots \\ \vdots & \vdots & \cdots & \vdots \\ r(T, 1) & r(T-1, 1) & \cdots & r(T-\tau_{max}, 1) \end{bmatrix} \quad \text{(eq. 4)}$$

where the set $\{\tau_{min}, \ldots, \tau_{max}\}$ represents the range of lags considered from a minimum lag $\tau_{min}$ to a maximum lag $\tau_{max}$.

This can be extended to an N-channel system by replacing each column of R with N columns each representing a separate channel. Thus, for N channels, the dimension of R would be T×N×$\tau$ window.

In the prior art, stimulus-reconstruction methods have used sound signals as stimulus and EEG signals as the response. In the present invention however, sound signal cepstral and the EEG signal cepstral have the same sampling frequency, are used for the calculation of the stimulus-reconstruction.

In the present invention, cepstral coefficients of the sound signal 11 and the EEG signal 12 are considered as the stimulus and response, respectively. This can be done by breaking (dividing) the sound signals and the EEG signal into non-overlapping time frames and then calculating cepstral coefficients for each of these frames. The first m coefficients are selected respectively.

It follows that frames can be considered as time points, with each frame giving m cepstral coefficients. We therefore let s(k) indicate the set of m cepstral coefficients for the k-th frame of the speech signal (stimulus), and write $$s(k) = \begin{bmatrix} s(k, 1) \\ \vdots \\ s(k, m) \end{bmatrix} \quad \text{(eq. 5)}$$

Considering the EEG signal (response) corresponding to the sound signal (stimulus), the fact that there are multiple sound signals needs to be taken into account.

Similar as for the sound signals 11, the EEG signal 12 is separated (for each respective channel in case of multiple EEG signals) into non-overlapping time frames.

For each time frame, the cepstral coefficients of the EEG signal 12 can be calculated, and the first m coefficients are selected. Letting r(k,m,n) indicate the m-th cepstral coefficients of the k-th frame of the n-th EEG channel, it can be written $$r(k) = \begin{bmatrix} r(k,1,1) & r(k,1,2) & \ldots & r(k,1,n) \\ \vdots & \vdots & \ddots & \vdots \\ r(k,m,1) & r(k,m,2) & \ldots & r(k,m,n) \end{bmatrix} \quad \text{(eq. 6)}$$

Now, the lag matrix needs to be considered. Since the signals are separated into frames, time points are the time frames of the signal.

As a result, the lags represent lags in time frames and the lag matrix can be set up in a similar way to eq. 4, with the difference that the time lags now represent time frames rather than time points in the original signal.

Therefore, the lag matrix using cepstral coefficients can be written as $$R = \begin{bmatrix} r(1-\tau_{min}) & r(-\tau_{min}) & \ldots & r(1) & 0 & \ldots & 0 \\ \vdots & \vdots & \ldots & \vdots & r(1) & \ldots & \vdots \\ \vdots & \vdots & \ldots & \vdots & \vdots & \ldots & 0 \\ \vdots & \vdots & \ldots & \vdots & \vdots & \ldots & r(1) \\ r(K) & \vdots & \ldots & \vdots & \vdots & \ldots & \vdots \\ 0 & r(K) & \ldots & \vdots & \vdots & \ldots & \vdots \\ \vdots & \vdots & \ldots & \vdots & \vdots & \ldots & \vdots \\ 0 & 0 & \ldots & r(K) & r(K-1) & \ldots & r(K-\tau_{max}) \end{bmatrix} \quad \text{(eq. 7)}$$

where K is the total number of frames.

Observing that eq. 5 is nested inside eq. 7, it follows that the model can be written as $$\hat{s}(k,m) = \sum_\tau \sum_n r(k-\tau,m,n) \cdot g(\tau,n) = Rg \quad \text{(eq. 8)}$$

where $\hat{s}$ is the reconstructed stimulus.

The function g is estimated by minimising the mean square error between s(k,m) and $\hat{s}$(k,m):

$$\min e = \min \sum_k [s(k,m) - \hat{s}(k,m)]^2 \quad \text{(eq. 9)}$$

As before, this is found using eq. 3, with R as the new lag matrix given in eq. 8:

$$g = (R^T R)^{-1} R^T s \quad \text{(eq. 10)}$$

In a further embodiment, as depicted in FIG. 2, the invention provides a hearing assistance system 200 for hearing devices with electroencephalography, EEG, dependent sound processing, comprising one or two hearing devices 210a, 210b for one user 220, each hearing device 210a, 210b being adapted for being located at, as shown in FIG. 2, or in an ear of the user or for being fully or partially implanted in the head of the user, each hearing device 210a, 210b comprising an output unit, not shown, for providing output stimuli perceivable by the user as sound, wherein at least one of the hearing device 210a, 210b comprises the speech classification apparatus 100 as described above, the at least one hearing device 210a, 210b is configured to provide the EEG input signal 12 by at least one EEG electrode 230, and the output stimuli are based on the correlation values calculated by the correlation unit 23.

In a further embodiment, the at least one hearing device 210a, 210b may comprise a hearing aid, a hearing instrument, a headset, an earphone, an ear protection device, a speakerphone or a combination thereof.

Moreover, the hearing assistance system 200 may comprise a first hearing device 210a and a second hearing device 210b, wherein the hearing assistance system 200 is configured to allow the exchange of information between the first and second hearing devices or between the first and second hearing devices and an auxiliary device.

Figure 3:
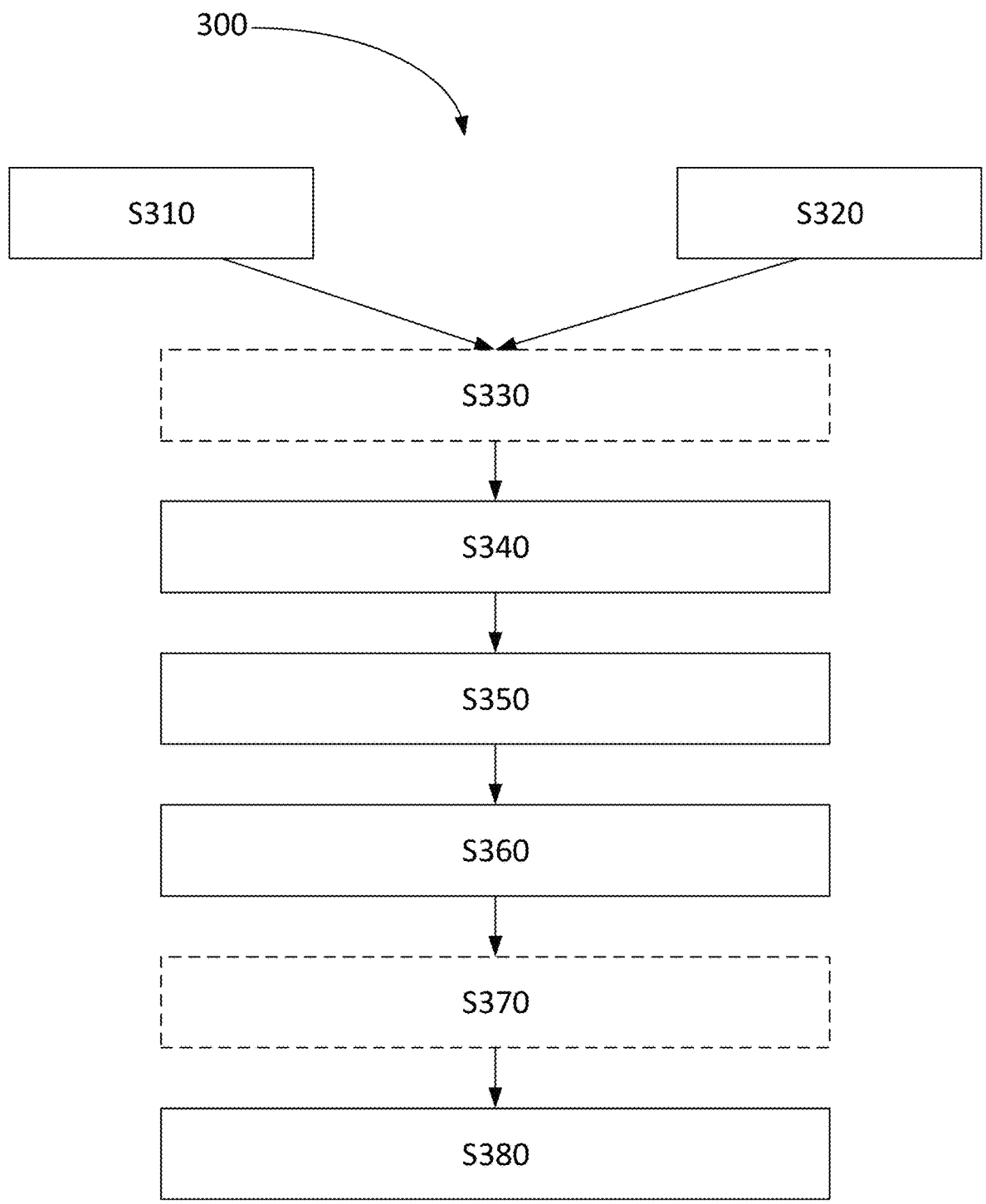
FIG. 3 illustrates a method according to an embodiment of the disclosure.

In a further embodiment, a speech classification method for hearing devices with electroencephalography, EEG, dependent sound processing is provided as depicted in FIG. 3. The method comprises capturing S310 one or more sound signals 11 from at least one external microphone 15 and segmenting the captured sound input signals into segmented sound signals 17. The method further comprises capturing S320 an EEG signal 12 of a user's brain, calculating S340 a speech cepstrum 13 for each segmented sound signal 17 and an EEG cepstrum 14 for the captured EEG signal 12, selecting S350 a predetermined number of coefficients from each calculated speech cepstrum 14 and from the calculated EEG cepstrum 13, calculating S360 a correlation value for each captured sound input signal 11 based on a correlation of the predetermined number of selected coefficients from the respective calculated speech cepstrum 14 with the predetermined number of coefficients selected from the calculated EEG cepstrum 13 and classifying S380 an attended speech source based on the obtained correlation values.

In one aspect, the cepstrum calculating S340 comprises calculating a real number of an inverse Fourier transform of a logarithmized power spectrum of the segmented sound signal (17a-e) and the EEG signal (12).

In one aspect, a pre-processing step S330 is performed before the cepstrum calculation step S340 comprising delaying the segmented sound signals (17) by a predetermined time set by the speech cepstrum calculation unit (21), or the EEG input signal (12) by a predetermined time set by the EEG cepstrum calculation unit (40).

In one aspect, wherein calculating the correlation value S360 comprising that the predetermined number of coefficients selected from each speech cepstrum 14 is correlated with the predetermined number of coefficients selected from the EEG cepstrum 13 using a linear regression method, a non-linear regression method, or using a neural network.

In one aspect, the method further comprises the step of identifying the selected sound input signal 11, which the user is listening to, based on the sound and EEG correlation values.

In the cepstrum calculation step S340, a speech cepstrum including cepstral coefficients, is calculated from each segmented sound signals 17a-e as described above. That is, the inverse discrete-time Fourier transform (IDTFT) of the logarithm of the discrete-time Fourier transform (DTFT) of the segmented sound signal 17a-e is calculated.

In the cepstrum calculation step S340, an EEG cepstrum is calculated from the EEG signal 12 as described above. That is, the inverse discrete-time Fourier transform (IDTFT) of the logarithm of the discrete-time Fourier transform (DTFT) of the EEG signal 12 is calculated.

In case a time synchronization between the one or more sound signals 11 and the EEG signal 12 is needed, the one or more sound signals 11 can be delayed by predetermined times before calculating the speech signal cepstra, or the EEG signal 12 can be delayed by a predetermined time before calculating the EEG signal cepstrum.

In the coefficient selection step S350, a predetermined number of cepstral coefficients is selected from the calculated one or more speech signal cepstra as well as from the calculated EEG signal cepstrum (speech recognition features), wherein the cepstral coefficients are discrete values calculated by the speech cepstrum calculation unit 21 and the EEG cepstrum calculation unit 40. As described before, also a predetermined set of coefficients may be selected, as long as the same coefficients are selected in each selection step.

In the correlation value calculation step S360, correlation values describing the correlation of each speech signal cepstrum with the EEG signal cepstrum are calculated according to the description provided above. The calculation may be based on the calculation of a normalised mean square error (NMSE) and Pearson's correlation coefficient ($\rho$), or may be based on a linear regression method, a non-linear regression method, or using a neural network.

The estimation step S370 is optional and may be performed only in a modification of the above embodiment, as shown in FIG. 1a. In the estimation step S370, the one sound input signal 11 that the user listens to, the attended sound signal, is determined based on the calculated correlation values.

The output of the estimation step S370, the identification value, may be used in further processing steps.

The classification step S380 an attended speech source is classified based on the obtained correlation values.

Results

In an example of the invention, two sound signals representing two different stories were pre-recorded. These two sound signals were played to 30 different test persons (users) in 30 individual trials. The users were asked to follow one of the two sound signals throughout a 30-minute long experiment. While playing the sound signals to the users, an EEG signal from each of the 30 different persons was recorded, and the resulting data was later evaluated using a sound processing apparatus according to the invention.

In detail, each person undertook 30 trials, each of substantially 1 minute in length, where each test person was presented with two classic works of fiction: one story was presented (played using a head set) to the left ear, and the other story was presented to the right ear. Each story was pre-recorded, read by a different male speaker.

The test persons were divided into two groups of 15 persons per group with each group instructed to attend either the story in their left or the story in their right ear throughout all 30 trials. After each trial, the test persons were required to answer between 4 and 6 multiple-choice questions on both stories to ensure that the test persons attend the selected story, and wherein each question had 4 possible answers.

A between-subjects design was used to ensure that each test person follows one story to make the experiment as natural as possible and to avoid any repeated presentation of stimuli. For both stories, each trial began where the story ended on the previous trial.

Stimulus amplitudes in each audio stream within each trial were normalised to have the same root mean squared (RMS) intensity. In order to minimise the possibility of the unattended stream capturing the subjects' attention during the silent periods in the attended stream, silent gaps exceeding 0.5 s were truncated to 0.5 s in duration. The stimuli were presented using headphones. The test persons were instructed to maintain visual fixation for the duration of each trial on a crosshair centred on the screen, and to minimise eye blinking and all other motor activities.

Electroencephalography data were recorded for the test persons' subject using 128 electrode positions. These data were then remapped to an equivalent 128 electrode positions using an interpolated spline function. The data were filtered over a range from 0 Hz to 134 Hz and digitised at the rate of 512 Hz. Data were referenced to the average of all scalp channels.

In order to decrease the processing time required, all EEG data were up-sampled to give an equivalent sampling rate of 1024 Hz. The speech signals were down-sampled to 1024 Hz to allow a relation of the dynamics to those of the EEG.

The resulting highest calculated correlation value for each of the user's was in average $r>0.5$, which is high compared to the prior art providing ranges of typically $r=0.1$-$0.2$.

In a similar way, a high classification accuracy rate (>95% for all test persons) was obtained by the method according to the invention for identification of the attended sound signal.

Further examples and simulations are presented in section 1-6 below.

A Computer Readable Medium

In an aspect, the functions may be stored on or encoded as one or more instructions or code on a tangible computer-readable medium. The computer readable medium includes computer storage media adapted to store a computer program comprising program codes, which when run on a processing system causes the data processing system to perform at least some (such as a majority or all) of the steps of the method described above, in the and in the claims.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium. For example, the method steps S310 to S380 may be implemented in software, while also the speech cepstrum calculation unit, the EEG cepstrum calculation unit, the selection unit, the correlation unit, and the estimation unit may be implemented in software.

A Data Processing System

In an aspect, a data processing system comprising a processor adapted to execute the computer program for causing the processor to perform at least some (such as a majority or all) of the steps of the method described above and in the claims. For example, the method steps S310 to S380 may be implemented in a data processing system, while also the speech cepstrum calculation unit, the EEG cepstrum calculation unit, the selection unit, the correlation unit, and the estimation unit may be implemented in a data processing system.

It is intended that the structural features of the devices described above, either in the detailed description and/or in the claims, may be combined with steps of the method, when appropriately substituted by a corresponding process.

There has been performed researches within the above described area and some of the simulations and results will be presented in section 1-6 below.

1. Introduction

One of the goals of the disclosed research is to use electroencephalogram (EEG) signals to create a brain-computer interface (BCI) system. This system would be able to decide which sound source a listener is attending to, and then steer the directional microphones and/or suppress noise as disclosed by Wostmann et al.

EEG signals are a measure of changes in the electrical potential on the surface of the scalp. The first recordings of brain electric potentials using scalp electrodes were made by Berger in the 1920s.

The first experiments investigating EEG responses to auditory stimuli found that the EEG response reflected auditory neural processing of simple tone pips. Following this, experiments using speech carried out in the 1970s showed that linguistic features such as the semantic meaning of words and the sentence context affect the neural processing of speech.

2. Digital Signal Processing

The mathematical concepts required to understand the experiments will firstly be presented. Both speech and EEG signals is used hence signals processing methods form the foundation.

2.1 Speech and EEG Signals

Sound is a pressure wave that passes through gases or liquids. With the application of sound energy, molecules alternate between compression and rarefaction along the path of the energy source. This is often represented by the graph of a sine wave. This representation of sound as an acoustic wave is how speech is usually represented. Sounds are alternating compressions and rarefactions in air molecules. A simple sound wave can be described by a sine wave.

Mathematically, an analog signal is defined as a function that varies in continuous time, x(t). Sampling this continuous signal, x, with a sampling period T, a discrete-time signal is obtained, or digital signal, which can be defined as x[n]=x(nT). Note the use of square brackets and the time-index n for the digital signal, as opposed to the curved brackets and t used for the analog signal. This convention is used throughout this text to distinguish between discrete and continuous signals. The sampling frequency can be defined as F=1/T. Throughout this text Hertz (Hz) will be used, where 1 Hz corresponds to a sampling frequency of 1 sample per second, and a sampling period of 1 second.

An EEG signal is a measurement of electrical currents that flow during synaptic excitations in the cerebral cortex. These electrical currents generate an electric field over the scalp that can be measured using EEG systems. EEG signals are recorded using multiple-electrodes placed either inside the brain (electrocorticogram (ECoG)), over the cortex under the skull (intracranial (iEEG) signals), or certain locations over the scalp (EEG). ScalpEEG is non-invasive and is the type of EEG signal used in this disclosure. Any further reference to EEG is referring to scalp EEG signals.

The statistics of speech and EEG signals, such as the mean and variance, do not remain stable over time. As such these signals are generally non-stationary. However, they are quasi-stationary, that is, they can be considered stationary within short time intervals.

One of the fundamental assumptions made in speech processing is that, when considered over short time intervals (generally 20-25 ms), speech signals can be considered stationary. Speech recorders commonly sample at a rate of 8-11 kHz.

Neural signals effectively range from 0.5-50 Hz. Based on their frequency ranges, they have been grouped into five major categories: Delta (0.5-4 Hz), Theta (4-8 Hz), Alpha (8-12 Hz), Beta (12-30 Hz), and Gamma (above 30 Hz, mainly up to 45 Hz). In some studies, the neural signal is filtered to consider only specific ranges. However, in this disclosure all frequencies of the EEG are retained.

Since EEG signals are lower frequency than speech, it follows that the sampling rate used can be lower whilst retaining the information of the signal. The sampling rate for EEG tends to be around 512 Hz.

2.2 Stationary Stochastic Processes

Let x(t) denote a continuous-time signal (an analog signal). By sampling this signal x with a sampling time interval $T_s$, that is $t=nT_s$, we obtain a discrete-time data sequence defined as $\{x[n]; n=0, +/-1, +/-2, \ldots\}$, is obtained, also known as a digital signal. Let this discrete-time data sequence $\{x[n]; n=0, +/-1, +/-2, \ldots\}$ be a stochastic process. This stochastic process has first and second moments defined as

| | |
|---|---|
| $m(n) = \mathbb{E}[x[n]]$ | mean value function |
| $v(n) = \mathbb{V}[x[n]]$ | variance function |
| $r(m,n) = \mathbb{C}[x[m]x(m)]$ | covariance function |
| $b(m,n) = E[x[m]x(m)]$ | second-moment function |
| $\rho(m,n) = p[x[m]x(m)]$ | correlation function |

Stationary stochastic processes will be used further on, in specific with weakly stationary processes. Such processes are those which, even after a change or displacement of the time scale, statistical properties (first and second order moments) remain the same. A discrete-time data sequence, $\{x[n]\}$, is a weakly stationary process if it has constant mean m(n) and its covariance function $r(s, t)<\infty$ is finite and is dependent only in the time changes T=m−n.

Let $E_s$ denote the energy of the discrete signal x[n], if this sequence x[n] has finite energy, i.e.

$$E_s = \sum_{n=-\infty}^{\infty} |x[n]|^2 < \infty, \qquad \text{(eq. 2.1)}$$

then the sequence x[n] has a discrete-time Fourier Transform (DTFT) defined as $$X(f) = \sum_{n=-\infty}^{\infty} x[n]e^{-i2\pi fn}, \qquad \text{(eq. 2.2)}$$

for frequency f with period $2\pi$. The present case will be working in the frequency domain, f. Note for reference that in some text notation can be found as $\omega=2\pi f$.

The original sequence x[n] is then obtained through the corresponding inverse discrete time Fourier Transform (IDTFT)

$$x[n] = \int_{-\frac{1}{2}}^{\frac{1}{2}} X(f)e^{i2\pi fn} df, \qquad \text{(eq. 2.3)}$$

and the Energy Spectral Density is defined as $$S(f)=X(f)X^*(f)=|X(f)|^2 \qquad \text{(eq. 2.4)}$$

where $(\bullet)^*$ denotes the complex-conjugate of a scalar variable or the conjugate transpose of a vector or matrix.

2.3 Digital Systems

Digital signals processing plays a fundamental role in speech processing, since one of the most popular ways of characterizing speech is in terms of a signal, or acoustic waveform.

It is known to refer to digital systems as those that given an input digital signal x(t), can generate an output signal y(t):

$$y(t)=T\{x(t)\} \quad \text{(eq.2.5)}$$

In general, a digital system T is defined to be linear if and only if $$T\{\alpha_1 x_1(t)+\alpha_2 x_2(t)\}=\alpha_1 T\{x_1(t)\}+\alpha_2 T\{x_2(t)\} \forall \alpha_1,\alpha_2 \in \mathbb{R} \quad \text{(eq.2.6)}$$

for any signals $x_1(t)$ and $x_2(t)$. T is defined to be time-invariant if the output is not affected by the particular point in time at which the input is applied to the system. Linear time-invariant systems can be described by $$y(t) = \sum_{k=-\infty}^{\infty} x(k)h(t-k) = x(t)*h(t)$$

By substituting $x(t)=e^{i2\pi f}$ in the previous equation we have $$y(t) = \sum_{k=-\infty}^{\infty} h(k)e^{i2\pi f(t-k)}$$

and using the commutative property of the convolution we obtain the following expression $$y(t) = \sum_{k=-\infty}^{\infty} h(k)e^{i2\pi f(t-k)} =$$

$$\sum_{k=-\infty}^{\infty} h(k)e^{i2\pi ft}e^{-i2\pi fk} = e^{i2\pi ft}\sum_{k=-\infty}^{\infty} h(k)e^{-i2\pi fk} = e^{i2\pi ft}H(e^{i2\pi f})$$

where $H(e^{i2\pi f})$ is the discrete-time Fourier Transform of h(t) and is expressed as a function of the frequency with period $2\pi$. It is called the system's frequency response or transfer function. In a similar way as described in the previous subsection, the corresponding inverse discrete-time Fourier transform is then $$h(t)=\int_{-\pi}^{\pi} H(e^{i2\pi f})e^{i2\pi ft}df.$$

2.4 Power Spectral Density (PSD)

If a signal has finite average power, then it can be described by the average power spectral density. Throughout the disclosure, reference will be made to the average spectral density of a signal as the Power Spectral Density (PSD). The PSD is a way to characterize and provide details about how this power is spread among frequencies.

The definition of covariance function given by Lindgren et al will be used. For m<n, let T be the time lag given by $\tau=n-m$, then the covariance function is given by $$r(\tau)=r(m,n)=C[x[m],x[m]]=\mathbb{E}(x[n]x[n-\tau])-m_x(n)m_x(m), \quad \text{(eq. 2.7)}$$

where $m_x(m)$ and $m_x(m)$ are the mean value functions of x[n] and x[m] respectively. For a discrete-time signal x[n] with zero mean it follows that $$r(\tau)=\mathbb{E}(x[n]x[n-\tau]). \quad \text{(eq. 2.8)}$$

An asymptotically unbiased estimator will be found for the covariance function using its corresponding sample covariance and assuming that the mean of the process m(n)=m is known. The following theorem formulates such estimator.

Theorem 1

The estimator $\hat{r}(\tau)$ of the covariance function $r(\tau)$ is given by $$\hat{r}(\tau) = \frac{1}{N}\sum_{n=1}^{N-\tau}(x[n]-m)(x[n-\tau]-m), \tau \geq 0, \quad \text{(eq. 2.9)}$$

and it is asymptotically unbiased if $$\lim_{N\to\infty}\mathbb{E}[\hat{r}(\tau)] \to r(\tau)$$

Eq. (2.8) is used to define the PSD (viewed as a function of frequency) as the DTFT of the covariance function:

$$R(f) = \sum_{\tau=-\infty}^{\infty} r(\tau)e^{-i2\pi f\tau}. \quad \text{(eq. 2.10)}$$

The covariance function $r(\tau)$ may be obtained via the Inverse DTFT of R(f):

$$IDFT\{R(f)\} = \quad \text{(eq. 2.11-14)}$$

$$\int_{-1/2}^{1/2} R(f)e^{i2\pi f\tau}df = \int_{-1/2}^{1/2}\sum_{k=-\infty}^{\infty} r(k)e^{-i2\pi fk}e^{i2\pi f\tau}df =$$

$$\sum_{k=-\infty}^{\infty} r(k)\int_{-1/2}^{1/2} e^{-i2\pi f(k-\tau)}df = r(\tau).$$

Now that the previous definitions for PSD is introduced, the nonparametric methods may be introduced and used in this disclosure to obtain an estimate of the PSD, R(f).

2.5 Nonparametric Methods of Spectral Estimation

In this section, the nonparametric methods of spectral estimation are introduced, that were considered throughout this disclosure, as well as some of their properties. When using nonparametric methods, there is a trade-off between resolution and high variance. The Periodogram is known for providing a good resolution in the peaks of the spectrum, but it has high variance. Numerous modified methods have been created with the aim of reducing this high variance (characteristic of the Periodogram), this variance reduction comes with a loss of resolution at the peaks. The periodogram will be used throughout the disclosure, the periodogram with Hanning windowing, the Welch method, and the multi-talker methods.

2.5.1 Periodogram

In estimating the spectral density of a stationary process $X_n$; $n \in Z$, which has been sampled to obtain a real value data sequence {x([n]; n=0, +/−1, +/−2, ... } and fulfills eq. 2.14. A spectral estimation of this data sequence may be made by using the periodogram, defined as $$\hat{R}(f) = \frac{1}{N}\left|\sum_{n=0}^{N-1} x[n]e^{-i2\pi fn}\right|^2, \quad \text{(eq. 2.15)}$$

the conjugate of the term can be used inside the absolute value to separate the power and expressed eq. 2.15 as $$\hat{R}(f) = \frac{1}{N}\left[\sum_{m=0}^{M-1} x[m]e^{-i2\pi fm}\right]\left[\sum_{n=0}^{N-1} x[n]e^{i2\pi fn}\right] = \quad \text{(eq. 2.16-17)}$$

$$\frac{1}{N}\sum_{n=0}^{N-1}\sum_{m=0}^{M-1} x[m]x[n]e^{-i2\pi f(m-n)}.$$

Let τ=m−n. If all possible M values are first summed and all terms x[m]x[n] are collected, it can be seen that for τ=0⇔m=n and it will end up with N possible terms $$x[0]x[0], x[1]x[1], \ldots, x[N-1]x[N-1].$$

For τ=1⇔m=n+1 it will end up with N−1 possible term $$x[0]x[1], x[1]x[2], \ldots, x[N-1]x[N],$$

and so on for values of m up to N−1−|τ| as T∈[−N+1, N+1]. It can be see that all possible combinations can be expressed as x[n]x[n−|τ|] and therefore write eq. 2.15 as $$\hat{R}(f) = \frac{1}{N}\sum_{\tau=-N+1}^{N-1}\sum_{m=0}^{N-1-|\tau|} x[n]x[n+|\tau|]e^{-i2\pi f\tau}. \quad \text{(eq. 2.18)}$$

Assuming that the mean of the process m(n)=m is known and equal to zero, it may be recognized that the expression for the estimator $\hat{r}(\tau)$ from eq. 2.13 in order to express the Periodogram in terms of the covariance function as $$\hat{R}(f) = \sum_{\tau=-N+1}^{N-1} \hat{r}(\tau)e^{-i2\pi f\tau}. \quad \text{(eq. 2.19)}$$

The expected value of the periodogram can be compute from this eq. 2.19 using the expression from eq. 2.18 for $\hat{r}(\tau)$.

$$\mathbb{E}[\hat{R}(f)] = \sum_{\tau=-N+1}^{N-1} \mathbb{E}[\hat{r}(\tau)]e^{-i2\pi f\tau} \quad \text{(eq. 2.20)}$$

here, if the term $\mathbb{E}[\hat{r}(\tau)]$ is expanded by letting N→∞ the asymptotically unbiased estimator is obtained for r(τ) yielding the next expression $$\mathbb{E}[\hat{r}(\tau)] = \frac{1}{N}\sum_{n=1}^{N-\tau} \mathbb{E}[(x[n]-m)(x[n-\tau]-m)] \quad \text{(eq. 2.21)}$$

$$= \frac{1}{N}\sum_{n=1}^{N-\tau} r(\tau) \quad \text{(eq. 2.22)}$$

$$= \left(\frac{N-\tau}{N}\right)r(\tau) \quad \text{(eq. 2.23)}$$

$$= \left(1 - \frac{\tau}{N}\right)r(\tau). \quad \text{(eq. 2.24)}$$

Substituting eq. 2.24 in eq. 2.20 the expected value of the periodogram can be expressed as $$\mathbb{E}[\hat{R}(f)] = \sum_{\tau=-N+1}^{N-1} \mathbb{E}[\hat{r}(\tau)]e^{-i2\pi f\tau} \quad \text{(eq. 2.25)}$$

$$= \sum_{\tau=-N+1}^{N-1} \left(1 - \frac{\tau}{N}\right)r(\tau)e^{-i2\pi f\tau}. \quad \text{(eq. 2.26)}$$

From this expression the so-called lag window can be obtained $$w[n] = \left(1 - \frac{\tau}{N}\right)$$

When N→∞, $\hat{R}(f)$ yields an estimate of the PSD which is asymptotically unbiased. But when dealing with values of N<∞, i.e., when working with finite length sequences of data that were obtained from infinite length sequence of data; a spectrum bias, B(f)=E[$\hat{R}$(f)]−R(f) will be obtained. On the one hand, this bias arises when working with finite length sequences of data. On the other hand, the characteristic variability in PSD estimations will be obtained which is not reduced even for large values of N. These two reasons make from the Periodogram an inconsistent estimator of the PSD. As an alternative to deal with this situation, one can try different types of lag window. The ones that were used within this disclosure will be presented in the next section.

2.5.2 Windowing

In practice it is common to window data in order to gain some side-lobes in the periodogram, which are the main reason for it to be a biased estimator. One way to reduce this bias is to use a window w of the same length as the data sequence; this windowing technique is also known as tapering of the data. Including this window w in eq. 2.26, the following expression for the modified periodogram is obtained $$\hat{R}_w(f) = \frac{1}{n}\left|\sum_{t=0}^{n-1} x(t)w(t)e^{-i2\pi ft}\right|^2. \quad \text{(eq. 2.27)}$$

Between the multiple windows, one of the most relevant and widely used is the Hanning window, $$h(t) = \frac{1}{2} - \frac{1}{2}\cos\frac{2\pi t}{n-1}, t = 0, \ldots, n-1. \quad \text{(eq. 2.28)}$$

If the Hanning window is compared with the periodogram, the sidelobes will drop more rapidly, stopping the power from leaking to the sides and instead remaining around the main lobes. The downside of this (which is related to the trade-off mentioned before) is that the main lobes might become wider, and if two main frequencies are close together, they can be misinterpreted as only one frequency.

3. Cepstral Processing 3.1 Introduction

In 1963, it was observed that the logarithm of the power spectrum of a signal plus it's echo (i.e. a signal followed by a delayed and scaled replica) consists of the logarithm of the signal spectrum and a periodic component due to the echo. With further spectral analysis it was found that it was possible to identify the periodic component in the log spectrum and therefore had a new indicator for the occurrence of an echo.

A new vocabulary was created to reflect the "applying spectral analysis techniques on the spectrum of a signal". The first syllable of words taken from spectral analysis was rearranged in order to highlight the connections between the two, while also making clear the difference between the methods. Hence, working in the quefrency domain, the spectrum of the log spectrum of a time waveform came to be known as the cepstrum, and filtering of this cepstrum was named liftering. Harmonics are named rahmonics in the quefrency domain.

The original definition of the cepstrum was based on the power spectrum of an analog signal. However, the application of the cepstrum using modern computing techniques requires digital processing and thus a clear definition of the cepstrum in terms of discrete-time signal theory was required. For discrete-time signals, the cepstrum is defined as the inverse discrete-time Fourier transform (IDTFT) of the logarithm of the DTFT of the signal. That is, for a discrete-time signal, x[n], the discrete-time cepstrum is given by $$c[n] = \int_{-\pi}^{\pi} \ln|X(e^{i2\pi f})| e^{i2\pi fn} df, \quad \text{(eq. 3.1)}$$

3.2 Homomorphic Systems

In the early 1960s, at the same time as Bogert et al. were working on the theory of the cepstrum, Al Oppenheim was researching a new theory in nonlinear signals processing referred to as homomorphic systems. Oppenheims work was based on applying linear vector space theory to signals processing. The idea was that certain operations of signal combination (particularly convolution and multiplication) satisfy the same axioms as vector addition in linear vector space theory.

Figure 4A:
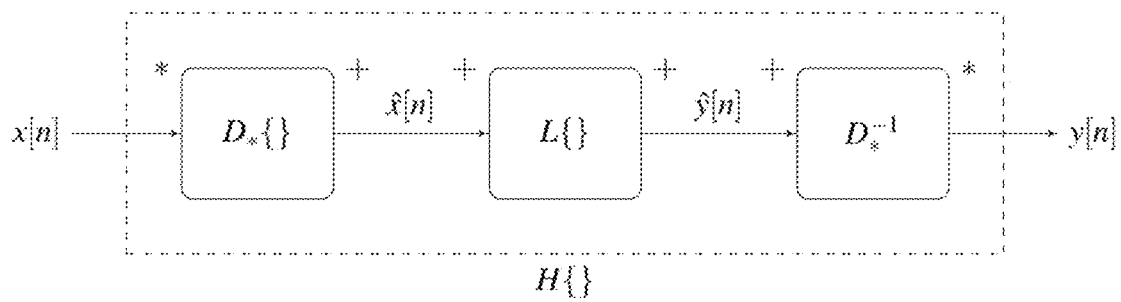
FIG. 4a-c illustrates a sequence of mathematical operations according to an embodiment of the disclosure.

Of interest here is the class of homomorphic systems for convolution. This can be represented through the diagram in FIG. 4a. D.{ } represents the characteristic system for convolution and transforms a combination by convolution into a corresponding combination by addition. D.{ } is therefore defined by the property that when x[n]=x1[n]*x2[n], the corresponding output is $$\hat{x}[n] = D_*\{x_1[n] * x_2[n]\} \quad \text{(eq. 3.2)}$$
$$= D_*\{x_1[n]\} + D_*\{x_2[n]\}$$
$$= \hat{x}_1[n] + \hat{x}_2[n]$$

L{ } is an ordinary linear system that satisfies the principle of superposition with addition as the input and output operation for signal combination. The inverse characteristic system, $$D_*^{-1}\{\ \},$$

must transform a sum into a convolution. The operations that apply at each stage are written at the top corners of each block.

Figure 4B:
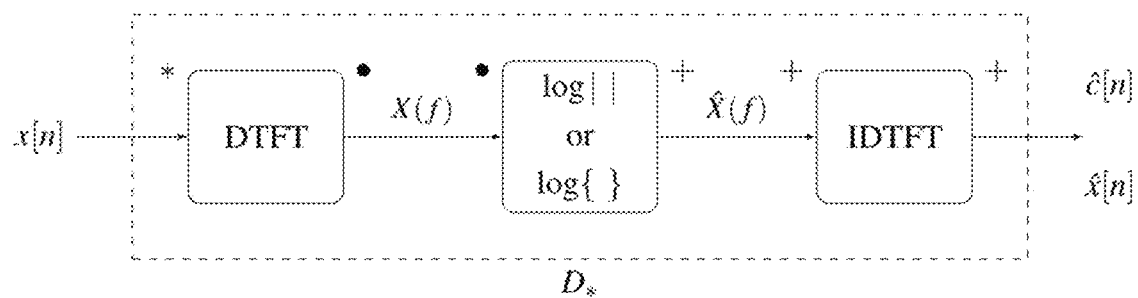

FIG. 4b gives a sequence of mathematical operations that satisfy the property of eq. (3.2). That is, we can represent ^x[n] by the equations $$\hat{X}(e^{i2\pi f}) = \log[X(e^{i2\pi f})] \quad \text{(eq. 3.3)}$$

$$\hat{x}[n] = \frac{1}{2\pi} \int_{-0.5}^{0.5} \hat{X}(e^{i2\pi f}) e^{i2\pi fn} df \quad \text{(eq. 3.4)}$$

where $\hat{X}(e^{i2\pi f})$ is the DTFT, eq. 3.3 is the complex logarithm, and eq. 3.4 is the IDTFT of the complex function $\hat{X}(e^{i2\pi f})$. Note that in eq. 3.3, the complex logarithm is used, which is defined as $$\ln X(e^{i2\pi f}) = \ln|X(e^{i2\pi f})| + i \cdot \arg[X(e^{i2\pi f})]. \quad \text{(eq. 3.6)}$$

Figure 4C:
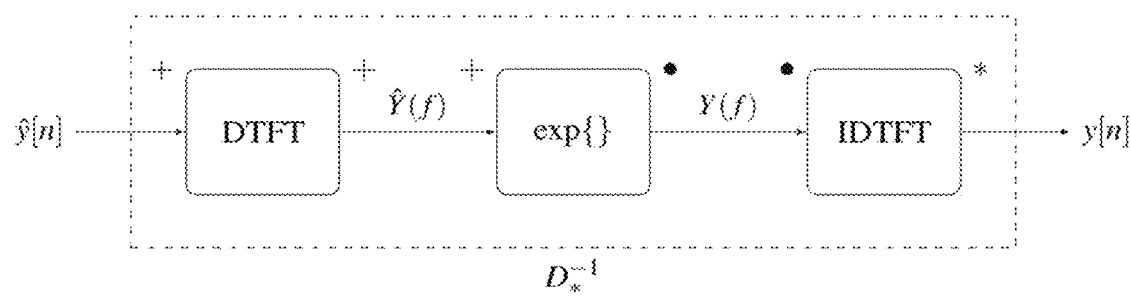

This sequence is illustrated using the diagram 3.1. The inverse of the characteristic system for convolution is shown in FIG. 4c and inverts the effect of the complex logarithm through applying the complex exponential.

The connection between the characteristic system for convolution and the cepstrum was first made during a discussion between Oppenheimer and Jim Flanagan, of Bell Telephone Laboratories in 1965. Flanagan remarked that the homomorphic system for convolution reminded him of the cepstrum proposed by Bogert et al. The characteristic systems for convolution given in diagram 3.1 and 3.2 were developed by Oppenheim, Schafer, and Stockham. Due to the similarities with the cepstrum given by Bogert et al, when Oppenheim, Schafer, and Stockham published their work in 1968, they called the output of the characteristic system for convolution (eqs. 3.3 to 3.4) the complex cepstrum.

The cepstrum is the real part of the complex cepstrum and differs from the complex cepstrum only in the fact that the log of the magnitude of the spectrum is taken rather than the complex logarithm. The real cepstrum is the most widely used in speech technology and as such we only consider the cepstrum in this project. Further references to the cepstrum are referring to the real cepstrum.

During the discussion between Oppenheim and Flanagan in 1965, Flanagan also suggested that Oppenheim look at work by Michael Noll. In 1964 Noll published two papers in the Journal of Acoustical Society of America (Noll and Schroeder, Noll) that applied cepstral analysis techniques to short-time segments of speech. Oppenheim and Schafer Cepstral processing of speech is considered later in the disclosure.

3.3 Cepstral Processing Example

As an illustration of the cepstrum, consider a signal with a simple echo, x(t). It can be written as $$x(t) = s(t) + \alpha s(t - \tau), \quad \text{(eq. 3.7)}$$

where $\tau$ and $\alpha$ represent the delay and scaling of the echo respectively. The spectral density of this signal is given by $$|X(f)|^2 = |S(f)|^2[1 + \alpha^2 + 2\alpha \cos(2\pi f\tau)] \quad \text{(eq. 3.8)}$$

Therefore, eq. 3.8 shows that the spectral density of a signal with an echo consists of the spectrum of the original signal modulating a periodic function of the frequency, f. Taking the logarithm of the spectrum, this product is converted to the sum of two components, that is $$C(f) = \log|X(f)|^2 = \log|S(f)|^2 + \log[1 + \alpha^2 + 2\alpha \cos(2\pi f\tau)] \quad \text{(eq. 3.9)}$$

Figure 5:
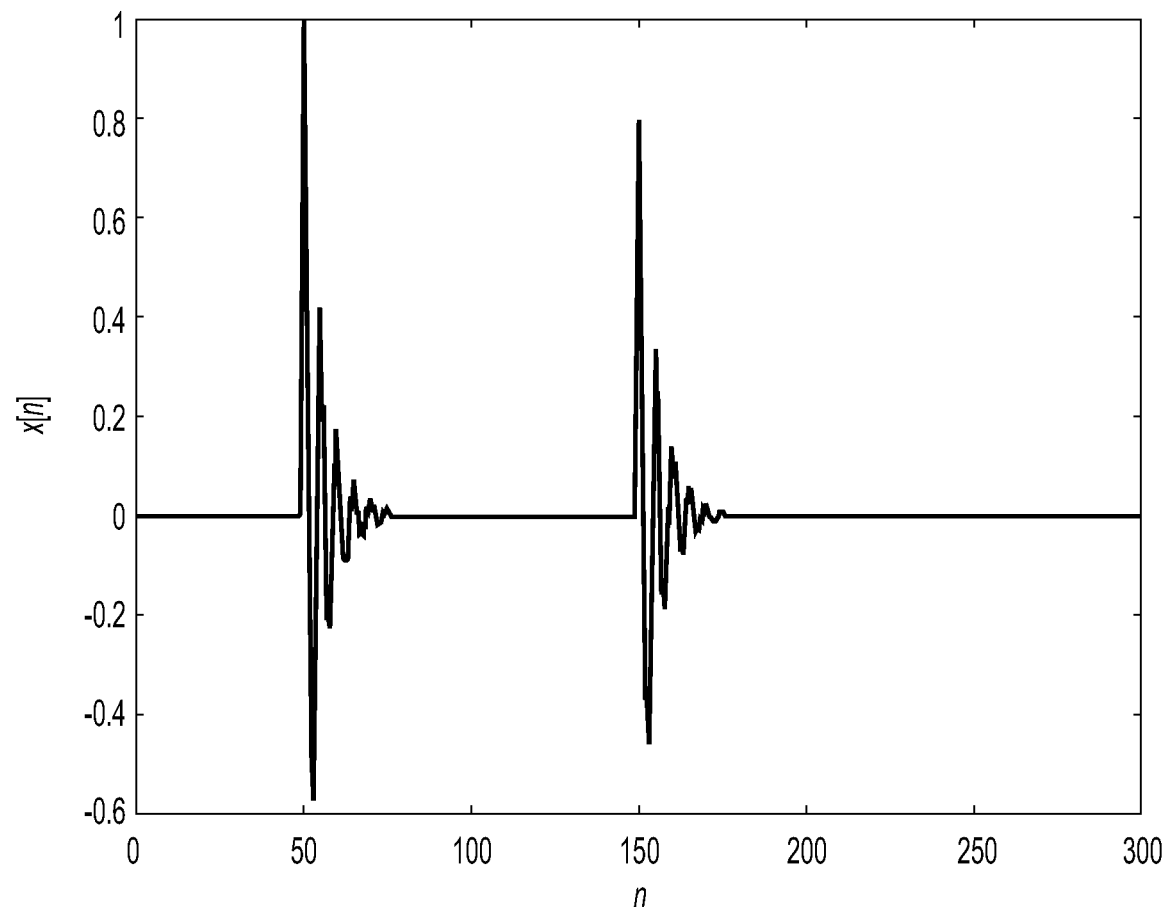
FIG. 5 illustrates a graphical view of a simulation according to an embodiment of the disclosure.

As a waveform, C(f) has an additive periodic component with T, the echo delay, as its "fundamental frequency". Taking the spectrum of this log spectrum would therefore show a peak where the original signal contained an echo, as shown in FIG. 5.

Let T=100, a=0.8, and x[n] be the signal of length N=26. The signal first occurs at n=50 and its echo occurs at n=150

Figure 6A:
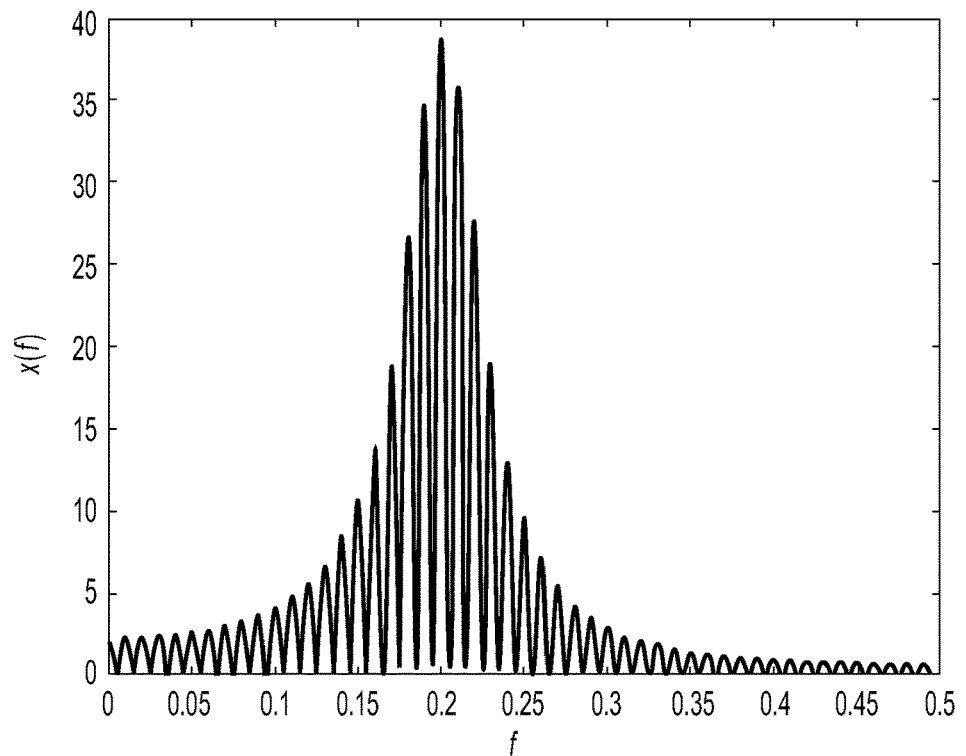
FIG. 6 a-b illustrates a graphical view of a simulation according to an embodiment of the disclosure.
Figure 6B:
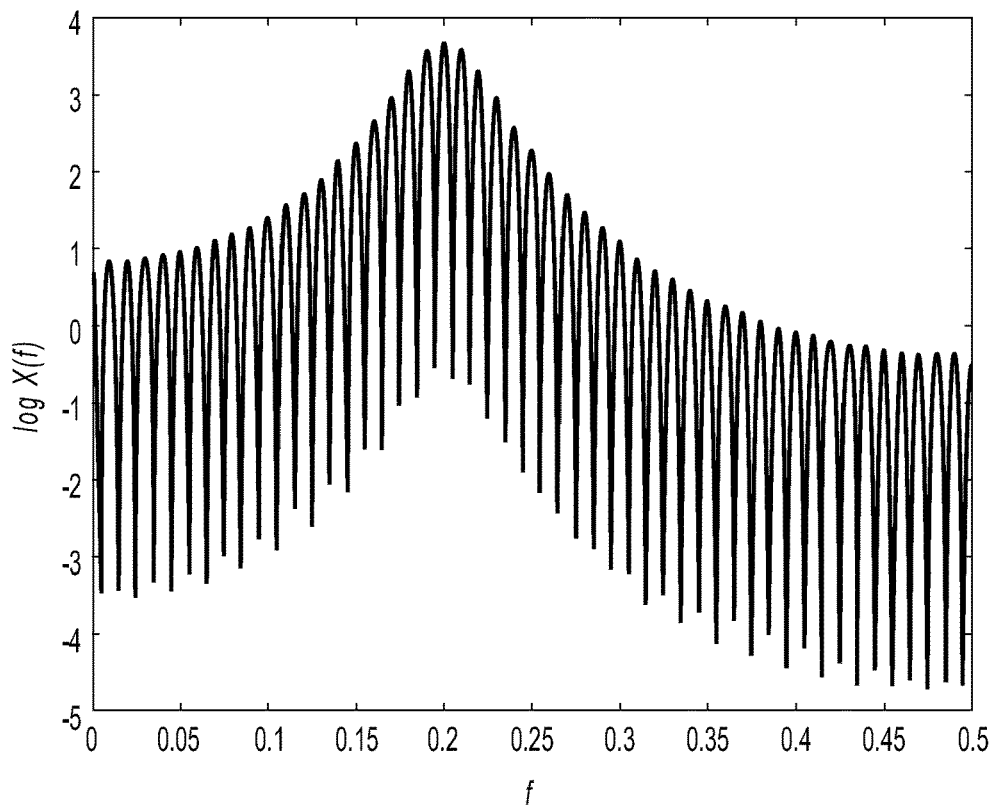

(i.e. a signal followed by a delayed and scaled replica). The PSD and the logarithm of the PSD of x[n] are shown respectively in FIG. 6a-b. FIG. 6a shows the Power Spectral Density, PSD, of the signal x[n] estimated using the Periodogram method. FIG. 6b shows the logarithm of the absolute value of the Power Spectral Density estimate. Observing the spectral density and the log spectral density of x[n] it is shown that the spectrum peaks f=0.2, indicating that this is the dominant frequency in the signal. It is also shown that the spectrum appears to have a high frequency and a low frequency component to it. There is the slowly varying envelope which peaks at f=0.2, and also a fast-varying fluctuation with visible periodicity.

Figure 7:
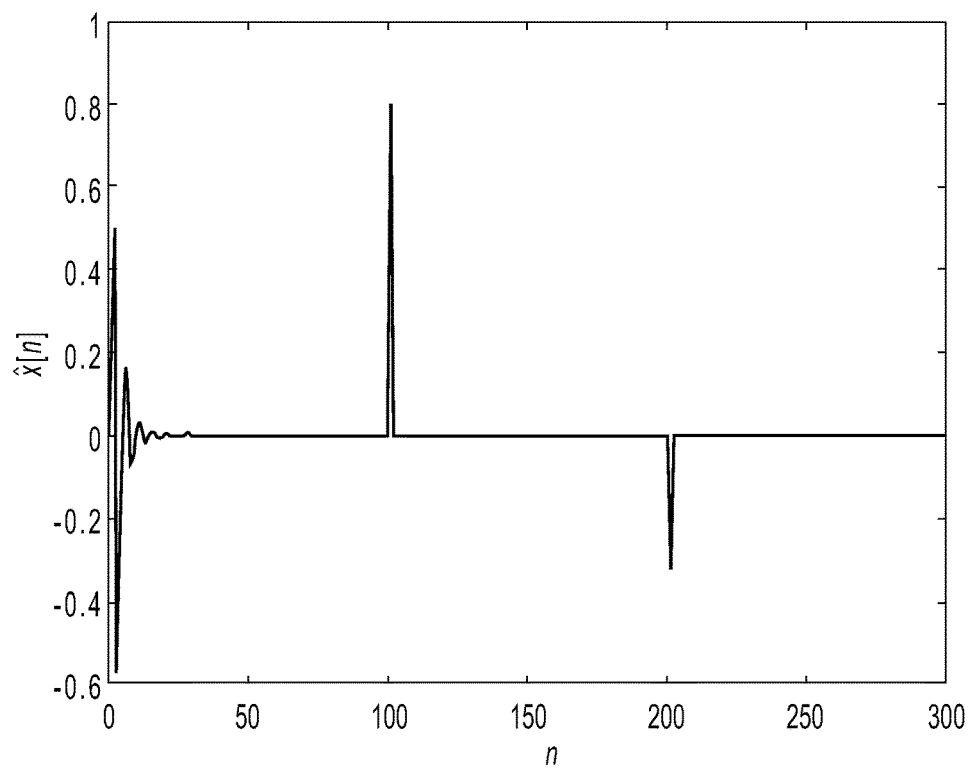
FIG. 7-8 illustrates a graphical view of a simulation according to an embodiment of the disclosure.
Figure 8:
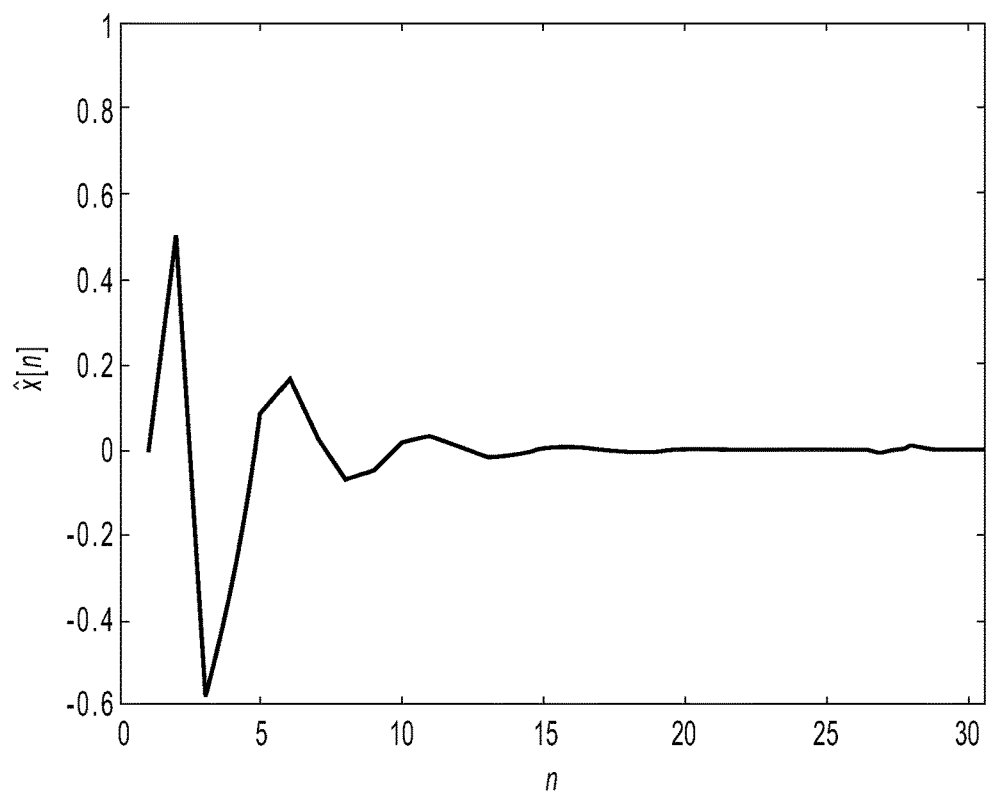

Applying the IDTFT to the log spectral density, the cepstrum is obtained, as shown in FIG. 7. The sharp peak at n=50 is the first rahmonic peak and is followed by other rahmonics at multiples of 100. This corresponds to the delay of the echo in x[n] being τ=100 time points after the initial signal. FIG. 8 shows the low quefrency range of the cepstrum ˆx[n].

Figure 9A:
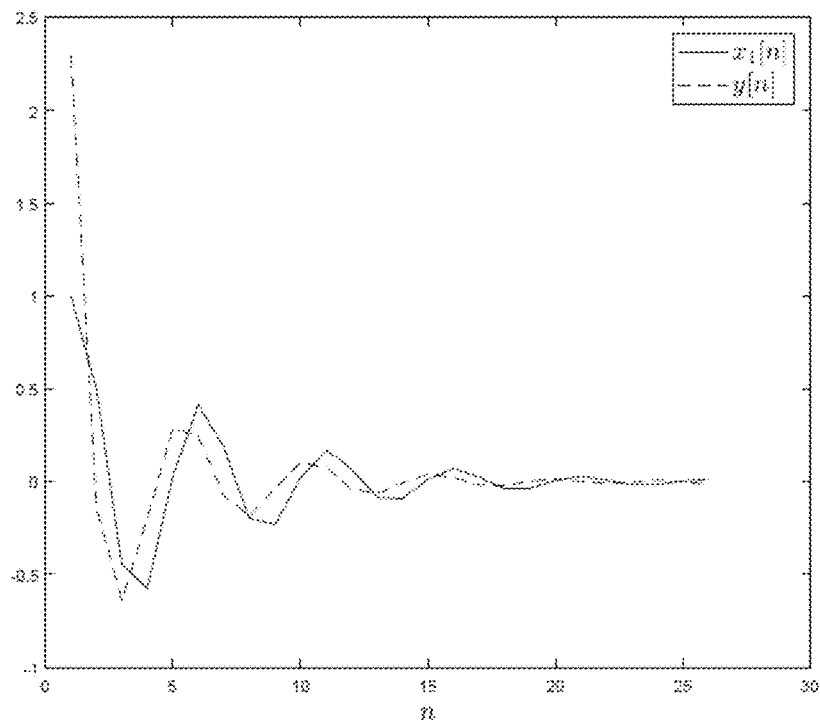
FIG. 9a-b illustrates a graphical view of a simulation according to an embodiment of the disclosure.
Figure 9B:
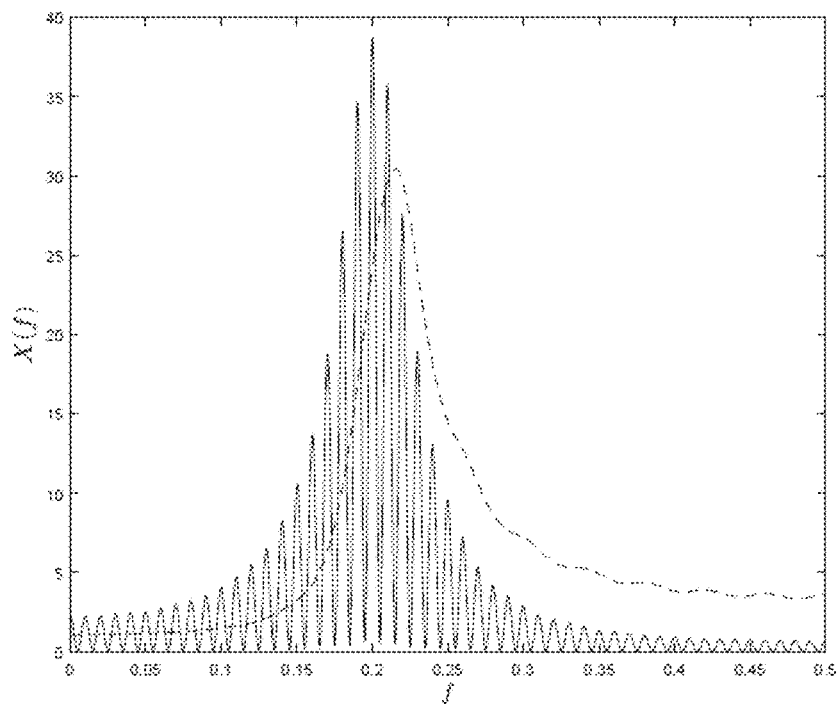

Making use of the concept introduced by Bogert et al. the different components that are in the cepstrum can be separated. Applying a low-pass filter to the cepstrum we obtain the low-quefrency component which is shown in FIG. 9a-b with the original impulse response, $x_1[n]$.

3.4 Cepstral Processing of Speech

Humans create speech signals through a series of controlled movements of their lungs, vocal cords, tongue, and lips.

Figure 10:
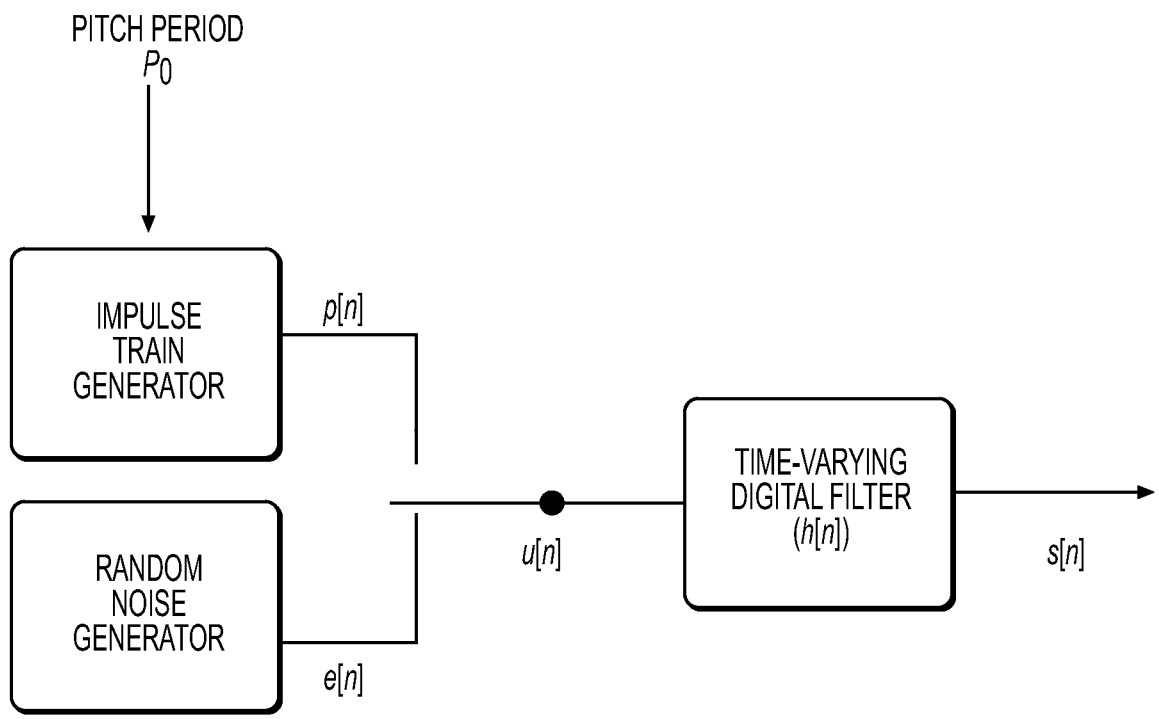
FIG. 10 illustrates a sequence of mathematical operations according to an embodiment of the disclosure.

A simple discrete-time model for a speech signal is given in FIG. 10. The impulse train generator models the glottal pulse excitation (corresponding to voiced speech), and the Random noise generator models the fricative excitation (corresponding to unvoiced speech) of the vocal tract. The time-varying digital filter is a linear system with a slowly time-varying impulse response which models the frequency resonances (formants) of the human vocal tract, the vocal tract response.

One of the central assumptions in speech processing is that, taken over short-time intervals, or frames (most commonly 20-30 ms), speech signals are stationary. A further assumption is that speech properties such as pitch period and vocal tract response are constant over these frames.

As such, over a frame of length L, we assume that a speech signal s[n] can be modeled as a convolution of the excitation u[n] and the filter h[n]

$$s[n]=u[n]\times h[n], 0\le n\le L-1 \quad \text{(eq. 3.10)}$$

where h[n] is the vocal tract response.

Here the significance of cepstral analysis becomes apparent since eq. 3.10 can be converted into a sum via a homomorphic transformation $$\hat{c}[n]=D_x(s[n])=\hat{h}[h]+\hat{e}[n] \quad \text{(eq. 3.11)}$$

4. Stimulus-Reconstruction

The stimulus-reconstruction approach attempts to reconstruct an estimate of an input stimulus, S, using a response, R, through a linear reconstruction model, g. This is a way of mathematically modelling a function that describes the way the neural response is mapped onto the stimulus, a technique known as system identification. Stimulus-reconstruction is a type of LTI system, and although the human brain is not a linear system, certain assumptions can be made which allow it to be modelled as one.

Stimulus-reconstruction has been used to model and predict selective attention in a multi-speaker environment in a number of studies.

Consider the reconstruction model, g(τ,n), which represents a linear mapping from the neural response, r(t,n), to the stimulus, s(t). This can be written as:

$$\hat{s}(t) = \sum_n \sum_\tau g(\tau, n) r(t-\tau, n) \quad \text{(eq. 1)}$$

where ŝ is the reconstructed stimulus, t is the time point, τ is the lag (in time points), and n is the EEG channel number.

The function g, is estimated by minimizing the MSE between s(t) and ŝ(t):

$$\min e = \min \sum_t [s(t) - \hat{s}(t)]^2 \quad \text{(eq. 2)}$$

This is found using the following equation:

$$g = (R^T R)^{-1} R^T s \quad \text{(eq. 3)}$$

where R is the lagged time series of the response matrix, r. For a single-channel response system, R is defined as:

$$R = \begin{bmatrix} r(1-\tau_{min},1) & r(-\tau_{min},1) & \dots & r(1,1) & 0 & \dots & 0 \\ \vdots & \vdots & \dots & \vdots & r(1,1) & \dots & \vdots \\ \vdots & \vdots & \dots & \vdots & \vdots & \dots & 0 \\ \vdots & \vdots & \dots & \vdots & \vdots & \dots & r(1,1) \\ r(T,1) & \vdots & \dots & \vdots & \vdots & \dots & \vdots \\ 0 & r(T,1) & \dots & \vdots & \vdots & \dots & \vdots \\ \vdots & \vdots & \dots & \vdots & \vdots & \dots & \vdots \\ 0 & 0 & \dots & r(T,1) & r(T-1,1) & \dots & r(T-\tau_{max},1) \end{bmatrix} \quad \text{(eq. 4)}$$

where the set {τmin, . . . , τmax} represents the range of lags considered.

This can be extended to an N-channel system by replacing each column of R with N columns each representing a separate channel. Thus, for N channels, the dimension of R would be T×N×τwindow.

Previous applications of the stimulus-reconstruction method have used the speech envelope as the stimulus and the EEG signal as the response. In this case, as long as the speech envelope and the EEG have the same sampling frequency, they can be used in the model outlined above.

The cepstral coefficients for speech and EEG were considered as the stimulus and response respectively. This was done by breaking the speech and EEG signals into non-overlapping time frames and then calculating cepstral coefficients over each of these frames.

It follows that frames can be considered as time points, with each frame giving m cepstral coefficients. The s(k) indicate the set of m cepstral coefficients for the k-th frame of the speech signal (stimulus), and writes as $$s(k) = \begin{bmatrix} s(k,1) \\ \vdots \\ s(k,m) \end{bmatrix} \quad \text{(eq. 5)}$$

Considering the EEG signal (response) corresponding to the speech signal (stimulus), it needs to be taken into account the fact that there are multiple channels. As was done for the speech signal, the EEG signal is broken for each respective channel into non-overlapping time frames. For each frame the cepstral coefficients is calculated, and the first m coefficients is saved. Letting r(k,m,n) indicate the m-th cepstral coefficient of the k-th frame of the n-th EEG channel, and writes as $$r(k) = \begin{bmatrix} r(k,1,1) & r(k,1,2) & \ldots & r(k,1,n) \\ \vdots & \vdots & \ddots & \vdots \\ r(k,m,1) & r(k,m,2) & \ldots & r(k,m,n) \end{bmatrix} \quad (eq.\ 6)$$

The lag matrix is now considered and since the signals is broken into frames, the time points are now time frames of the signal. As a result, the lags represent lags in frames and the lag matrix could be set up in a similar way to eq. 4, with the difference that the time lags now represent time frames rather than time points in the original signal. Therefore, the lag matrix using cepstral coefficients can be written as $$R = \begin{bmatrix} r(1-\tau_{min}) & r(-\tau_{min}) & \ldots & r(1) & 0 & \ldots & 0 \\ \vdots & \vdots & \ldots & \vdots & r(1) & \ldots & \vdots \\ \vdots & \vdots & \ldots & \vdots & \vdots & \ldots & 0 \\ \vdots & \vdots & \ldots & \vdots & \vdots & \ldots & r(1) \\ r(K) & \vdots & \ldots & \vdots & \vdots & \ldots & \vdots \\ 0 & r(K) & \ldots & \vdots & \vdots & \ldots & \vdots \\ \vdots & \vdots & \ldots & \vdots & \vdots & \ldots & \vdots \\ 0 & 0 & \ldots & r(K) & r(K-1) & \ldots & r(K-\tau_{max}) \end{bmatrix} \quad (eq.\ 7)$$

where K is the total number of frames.

Observing that eq. 6 is nested inside eq. 7, it follows that the model is written as $$\hat{s}(k,m) = \sum_m \sum_\tau \sum_n r(k-\tau,m,n) \times g(\tau,m,n) = Rg \quad (eq.\ 8)$$

where $\hat{s}$ is the reconstructed stimulus.

The function g is estimated by minimizing the MSE between s(k,m) and $\hat{s}$(k,m):

$$\min e = m \sum_k [s(k,m) - \hat{s}(k,m)]^2 \quad (eq.\ 9)$$

As before, this is found using eq. 3, but now with R as the new lag matrix given in eq. 7:

$$g = (R^T R)^{-1} R^T s \quad (eq.\ 10)$$

The reconstruction model is now completed, g, and an EEG signal may be taken and reconstruct a speech signal. This speech signal is a prediction of the speech signal that led to that neural response. Then by using the NMSE and Pearson ρ values to compare this prediction with the two different respective speech streams. The NMSE and ρ values give us a prediction of which speech stream the listener was attending to and the speech stream with the highest NMSE and ρ values is deemed to be the attended speech stream. This prediction is then compared with the true result to give a classification outcome correct or incorrect.

The g was trained on 29 of the 30 trials and then tested on the 30th trial. Taking each of the trials as a testing set respectively, and training using the remaining 29 trials, 30 classification results was able to be obtained for each subject. The classification rates were then based on the number of these 30 results that were correct.

5. Simulation of the Cocktail Party Problem

As described in the beginning, when a subject is in a scenario where different speakers are competing at the same time, we would like to identify which of the speakers the subject is trying to attend. In this chapter we outline our preliminary investigation into the connection between the cepstral coefficients of an attended speech signal and an EEG signal respectively.

First a speech signal considered, which will be referred to as the attended speech. Then, under the assumption that an EEG response follows an attended speech signal, an extremely rudimentary EEG signal is simulated by adding white noise to the attended speech signal. This simulated EEG signal will be referred to as $EEG_{sim}$. Since $EEG_{sim}$ was constructed from the attended speech signal, if little to no noise was added, it will be possible to make a connection between the two signals. The aim was then to investigate how much noise that could be added when creating $EEG_{sim}$ before it was unable to recognize the connection between the two signals. To do this, the cepstral coefficients of the attended speech, and the $EEG_{sim}$, were obtained and compared using normalised mean square error (NMSE) and Pearsons correlation coefficient (ρ). The NMSE provides a measure of how close the cepstral coefficients from the attended speech$_{sim}$ were to the cepstral coefficients of $EEG_{sim}$. The NMSE takes values in the interval (−∞,1], the value one being a perfect match and zero meaning there is no difference between the fitted sequence and a straight line. In order to measure the linear correlation between the cepstral coefficients of the two signals, the Pearson's correlation coefficient ρ was used. These NMSE and ρ values were found for different levels of added noise in $EEG_{sim}$ to give an idea of the noise level at which the cepstral coefficients of the $EEG_{sim}$ no longer matched those of the attended speech.

It was supposed that both the speech and the EEG signals were 1 second long. Two different types of attended speech were used. The first signal, which will be denoted as attended speech$_{sim}$, was simulated using an impulse train and an impulse response. The second signal was the real speech signal used in the previous chapter 2, denoted as attended speech$_{real}$.

Two types of $EEG_{sim}$ were considered. The first was obtained by adding a realization of white noise to the attended speech, it will be referred to as $EEG_{sim1}$. The second, $EEG_{sim2}$, was obtained by adding a realization of simulated background EEG to the attended speech. In the first stage of this chapter a single 20 ms frame was used for each of the signals. Later on the analysis was extended and all frames was considered for the whole 1 second length of the signals. This was in order to investigate the behavior of the coefficients through time.

The eight setups will be shown and tested. For each setup, 10,000 simulations was ran at a range of SNR levels to assess the level of accuracy in finding connections between the attended speech and the simulated EEG.

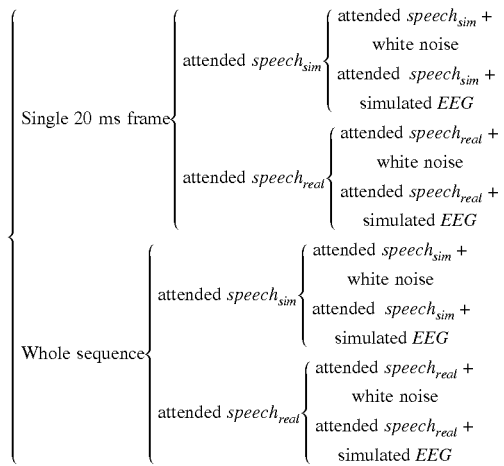

5.1 Simulated Speech and Simulated EEG—Single 20 ms Frame

Figure 11A:
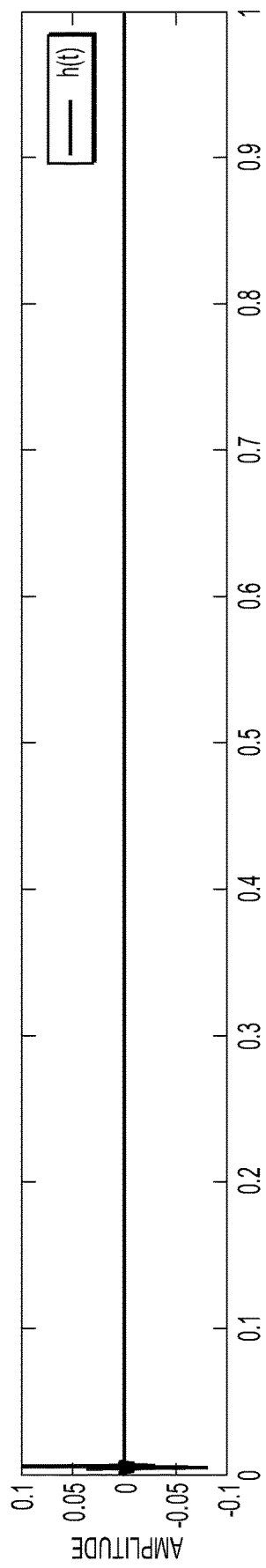
FIG. 11 a-c illustrates a graphical view of a simulation according to an embodiment of the disclosure.
Figure 11B:
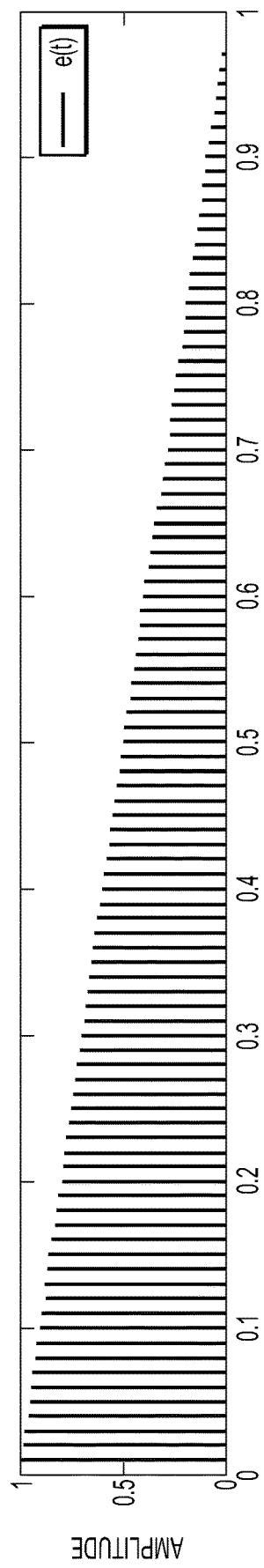
Figure 11C:
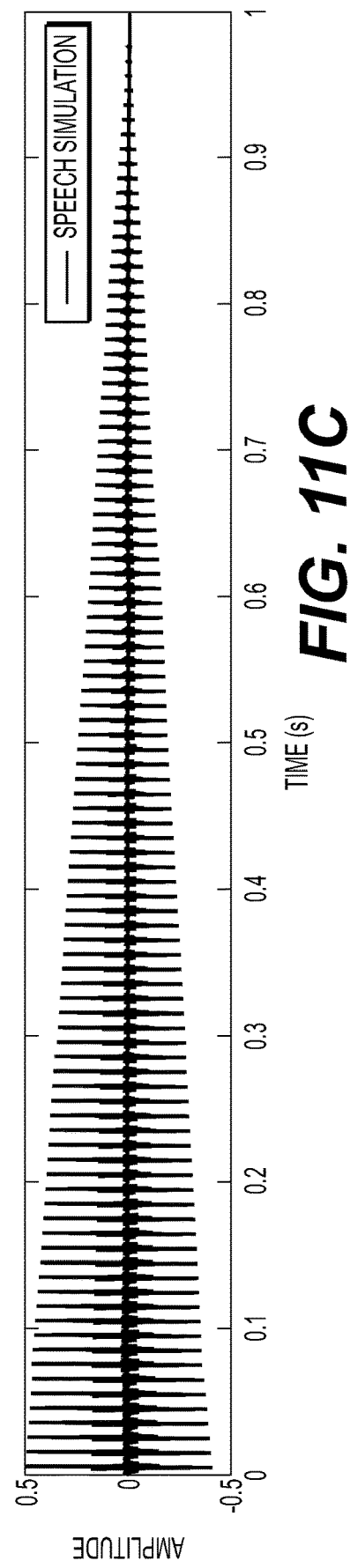

The reasoning of why speech signals can be modeled as an impulse train and impulse response, has been discussed earlier in the disclosure. With this idea in mind and for the first point, simulated speech and EEG signals as well as different types and levels of noise were considered. The simulated speech signals were created using the impulse response of a linear filter h[n], which was convolved with an impulse train e[n]. Attended speech$_{sim}$ was simulated with 10,000 data points. Since for this exercise signals are simulated that are 1-second-long, it follows that the sampling frequency for attended speech$_{sim}$ is 10,000 Hz. FIG. 11c shows a simulation of 1 second of attended speech$_{sim}$ obtained from the convolution of an impulse response h(t), as shown in FIG. 11a, with the impulse train e(t), as shown in FIG. 11b.

Two types of simulated noise were considered: white noise, and simulated background EEG. The white noise sequence was obtained by generating 1,000 random numbers from a N(0,1) distribution. The simulated background EEG was obtained from fitting an AR(15) model to EEG recordings taken from a single channel close to the left ear (channel T5).

FIG. 12a shows a simulation of white noise. For this exercise, the simulated signals are 1 second long. The 1,000 noise points correspond to a sampling frequency of 1000 Hz, in order to match this frequency with the one from the attended speech$_{sim}$ (10 kHz), up-sampling using interpolation was performed on the noise signals by resampling the noise sequence at 10 times the original sampling rate. Once the two signals had the same number of points and the same sampling frequency, the two noise signals were added to the attended speech signal respectively giving $EEG_{sim1}$=attended speech$_{sim}$+white noise $EEG_{sim2}$=attended speech$_{sim}$+simulated background EEG The two types of noise were scaled up to different levels of signal-to-noise ratio (SNR) to identify up to which point it was still possible to identify the cepstrum coefficients as described above. For a clearer measure of the different levels of noise, the scaling factor σ was derived from the Signal-to-Noise Ratio $$SNR = 10\log_{10}\frac{P_{signal}}{\sigma \times P_{noise}} \quad (eq. 5.1)$$

that is, $$\sigma = \frac{P_{signal}}{P_{noise} \times 10^{\frac{SNR}{10}}} \quad (eq. 5.2)$$

The σ corresponding for different levels of SNR was obtained. FIG. 12c includes a visualization of the noise scaled by the factor that corresponds to an SNR of −10. FIG. 12a shows a realization of the up-sampled noise, FIG. 12b shows the attended speech$_{sim}$, and finally, FIG. 12c shows a $EEG_{sim}$ obtained by adding together these two signals from (a) and (b) using SNR=−10.

Following the procedure detailed in the above section, a 20 ms frame was taken from the signals, and the cepstral coefficients were obtained for the attended speech$_{sim}$ and $EEG_{sim}$ using the following PSD estimation methods (PSDE): FFT using a Gaussian window, Periodogram, Periodogram with a Hanning window, Welch method and Multitaper.

For this exercise, the first 13 cepstral coefficients from these 20 ms frames were kept and then compared with each other using the NMSE and Pearson ρ value as described above. The following tables show the mean values of the NMSEs and the ρ for the 10,000 runs.

FIG. 13a shows the mean values of NMSE and FIG. 13b shows the mean values of ρ of the fit from the attended speech$_{sim}$ cepstral coefficients and the $EEG_{sim1}$ (white noise) cepstral coefficients, using different PSDE methods. The x-axis shows the SNR ranging from −40 to 0.

TABLE 5.1

Mean values of NMSE for 10,000 realizations of attended speech$_{sim}$ and $EEG_{sim1}$

| PSDE | SNR = −40 | SNR = −30 | SNR = −20 | SNR = −10 | SNR = 0 |
|---|---|---|---|---|---|
| FFT | 0.0085 | 0.0199 | 0.1595 | 0.4584 | 0.7452 |
| Periodogram | 0.0257 | 0.0266 | 0.0738 | 0.3624 | 0.7284 |
| Hanning | 0.0008 | 0.0258 | 0.2006 | 0.4804 | 0.7516 |
| Welch | 0.0059 | 0.0128 | 0.1149 | 0.4239 | 0.7625 |
| Multitaper | 0.0016 | 0.0450 | 0.2475 | 0.5218 | 0.7665 |

TABLE 5.2

Mean values of ρ for 10,000 realizations of attended speech$_{sim}$ and $EEG_{sim1}$

| PSDE | SNR = −40 | SNR = −30 | SNR = −20 | SNR = −10 | SNR = 0 |
|---|---|---|---|---|---|
| FFT | −0.0155 | 0.0757 | 0.4492 | 0.7879 | 0.9333 |
| Periodogram | −0.0141 | −0.0079 | 0.1930 | 0.7289 | 0.9323 |
| Hanning | 0.1336 | 0.3156 | 0.5764 | 0.8113 | 0.9370 |
| Welch | 0.0008 | 0.0875 | 0.3673 | 0.6999 | 0.9413 |
| Multitaper | 0.0697 | 0.3099 | 0.6037 | 0.8226 | 0.9435 |

Figure 14A:
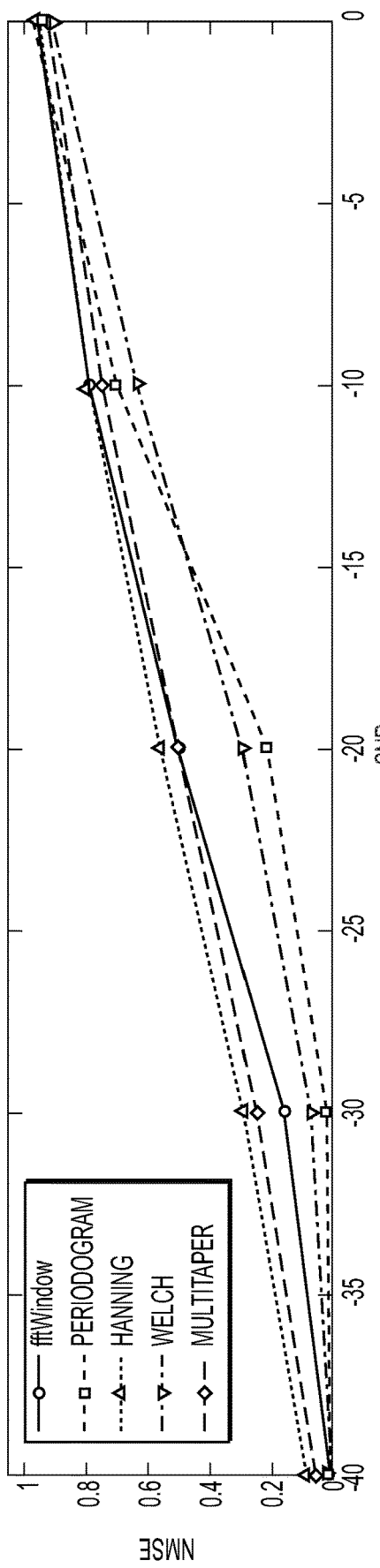
FIG. 14 a-b illustrates a graphical view of a simulation according to an embodiment of the disclosure.
Figure 14B:
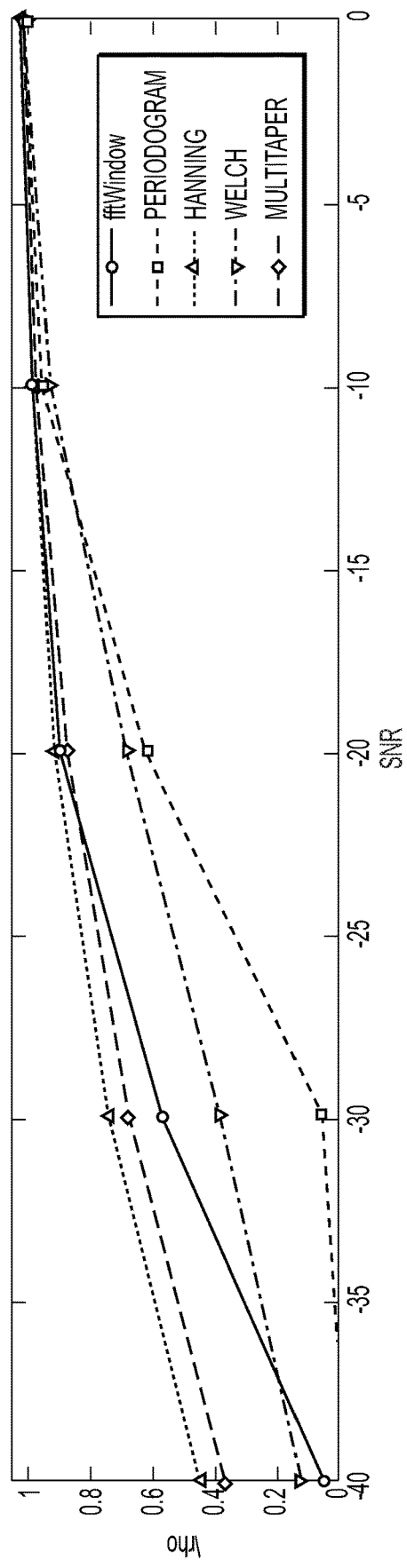

FIG. 14a shows the mean values of NMSE and FIG. 14b shows the mean values of ρ of the fit from the attended speech$_{sim}$ cepstral coefficients and the $EEG_{sim2}$ (simulated background EEG) cepstral coefficients, using different PSDE methods. The x-axis shows SNR from −40 to 0.

TABLE 5.3

Mean values of NMSE for 10,000 realizations of attended speech$_{sim}$ and EEG$_{sim2}$

| PSDE | SNR = −40 | SNR = −30 | SNR = −20 | SNR = −10 | SNR = 0 |
|---|---|---|---|---|---|
| FFT | 0.0218 | 0.1828 | 0.5007 | 0.7689 | 0.9252 |
| Periodogram | 0.0218 | 0.0658 | 0.3511 | 0.7280 | 0.9193 |
| Hanning | 0.0760 | 0.2735 | 0.5375 | 0.7760 | 0.9251 |
| Welch | 0.0178 | 0.1120 | 0.3705 | 0.7058 | 0.9335 |
| Multitaper | 0.0848 | 0.3032 | 0.5540 | 0.7768 | 0.9189 |

TABLE 5.4

Mean values of $\rho$ for 10,000 realizations of attended speech$_{sim}$ and EEG$_{sim2}$

| PSDE | SNR = −40 | SNR = −30 | SNR = −20 | SNR = −10 | SNR = 0 |
|---|---|---|---|---|---|
| FFT | 0.1299 | 0.6188 | 0.8967 | 0.9761 | 0.9962 |
| Periodogram | 0.0197 | 0.2477 | 0.8038 | 0.9642 | 0.9940 |
| Hanning | 0.4853 | 0.7597 | 0.9138 | 0.9771 | 0.9961 |
| Welch | 0.2015 | 0.4660 | 0.7626 | 0.9528 | 0.9938 |
| Multitaper | 0.4552 | 0.7670 | 0.9125 | 0.9764 | 0.9960 |

Figure 15A:
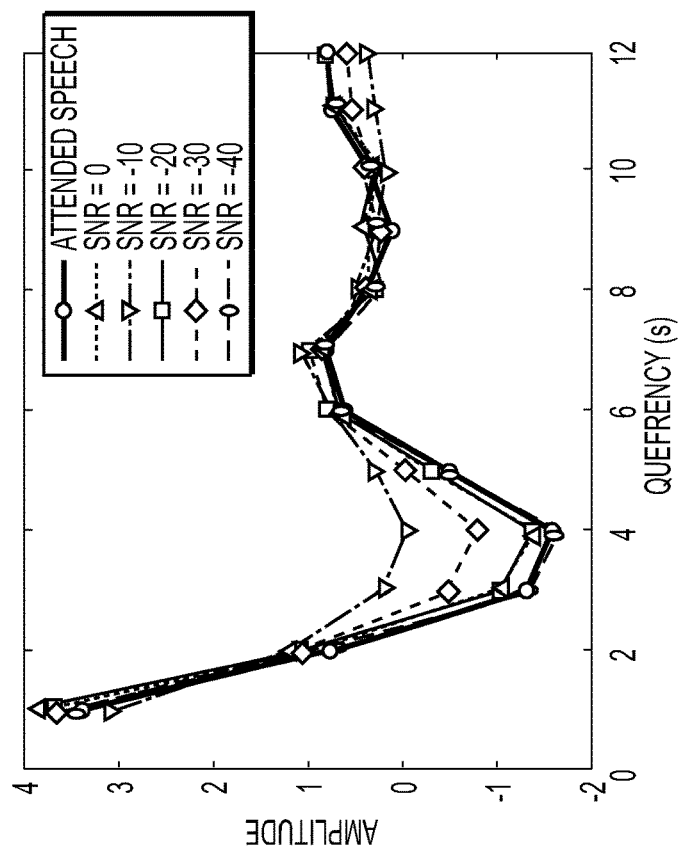
FIG. 15 a-b illustrates a graphical view of a simulation according to an embodiment of the disclosure.
Figure 15B:
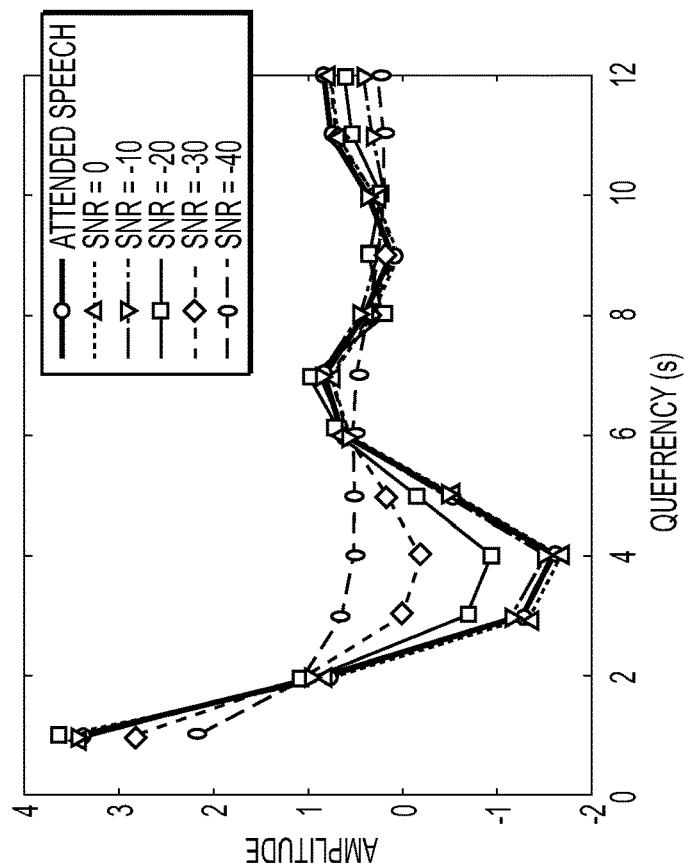

FIG. 15 *a-b* shows the first 13 cepstral coefficients of a realization from the sequences: attended speech$_{sim}$ (shown in blue) and EEG$_{sim1}$. (dotted lines). For reference (in red) the cepstral coefficients for the "pure" noise were displayed. FIG. 15*a* corresponds to one realization using white noise and FIG. 15*b* to one realization using simulated background EEG. From these graphs it can be seen how the gradient from the attended speech$_{sim}$ cepstral coefficients follow the gradient from EEG$_{sim1}$ and EEG$_{sim2}$.

Looking at the NSMEs from tables 5.1 and 5.3, it can be observed that among the selected PSDE methods, the periodogram with a Hanning window gives the best fit for the coefficients of the two frames. This is also confirmed by the $\rho$ values shown in tables 5.2 and 5.4. It can also be seen from FIG. 15*a-b* that once the SNR levels reach −30 to −40, the EEG$_{sim}$ coefficients follow the noise coefficients more closely and it becomes complicated to assess the goodness of fit.

5.2 Real Speech and Simulated EEG—Single 20 ms Frame

For this second setup, the same procedure from section 4.1 was performed but this time using real speech instead of simulated speech. As in section 4.1, two different types of noise were added to the speech stream and various SNR levels in order to obtain simulated EEG. The simulations had 10,000 data points and were considered to be 1-second-long, which corresponded to a sampling frequency of 10,000 Hz. For the attended speech$_{real}$ one second of speech taken from the previous recording saying "Hola" was used. Two types of noise were added to the real speech signal to obtain two EEG simulations $$EEG_{sim_1} = \text{attended speech}_{real} + \text{white noise} \quad (eq. 5.3)$$

$$EEG_{sim_2} = \text{attended speech}_{real} + \text{simulated background EEG} \quad (eq\ 5.4)$$

Figure 16A:
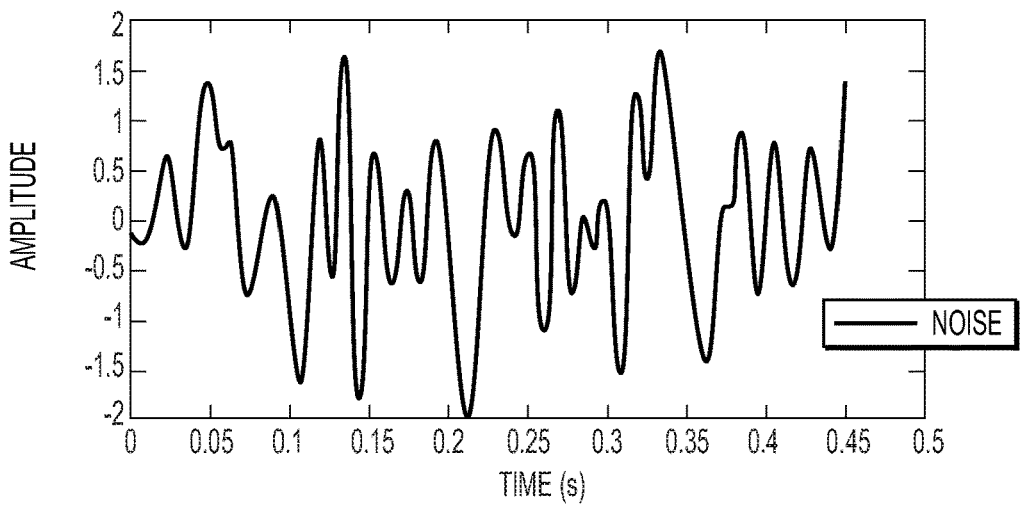
FIG. 16 a-c illustrates a graphical view of a simulation according to an embodiment of the disclosure.
Figure 16B:
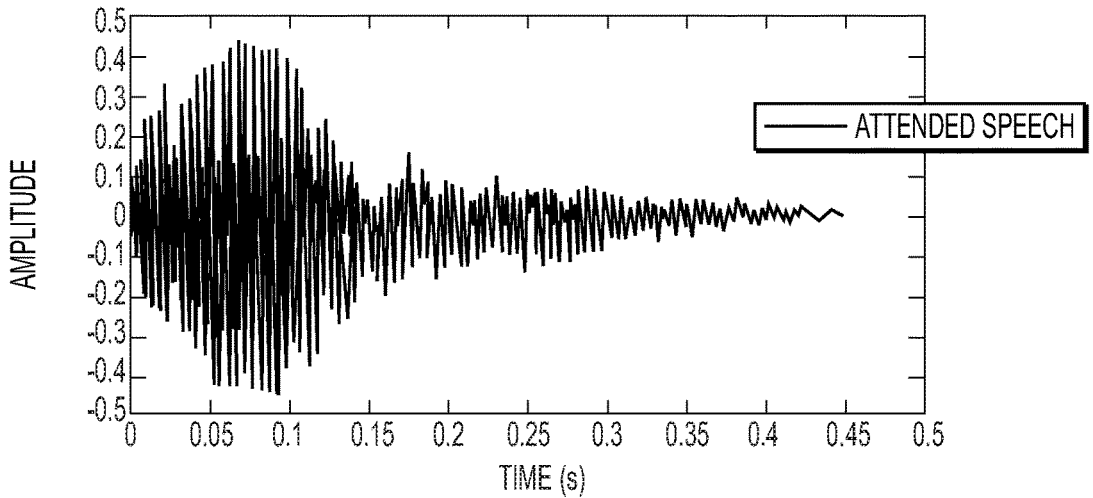
Figure 16C:
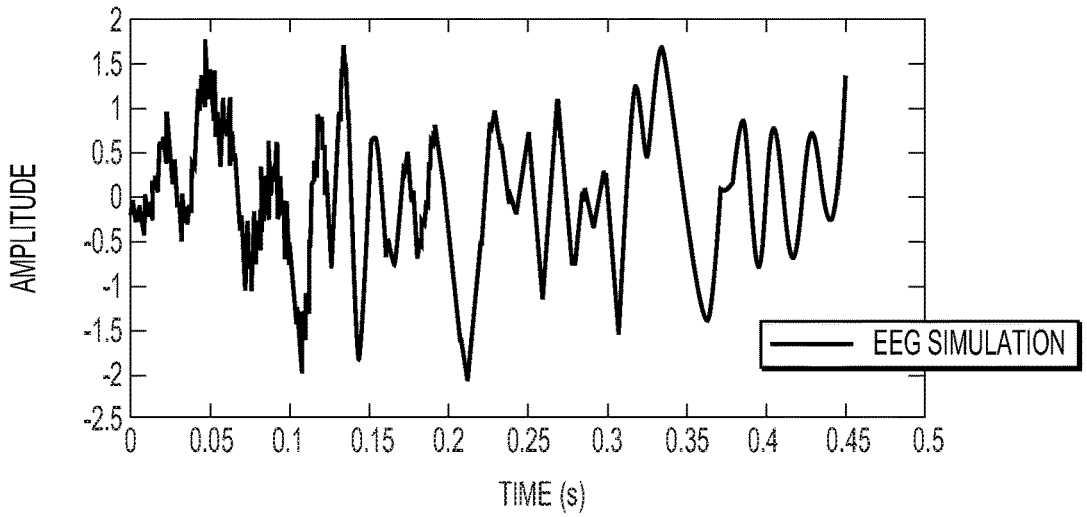

FIG. 16*a-c* shows the following: FIG. 16*a*, shows a simulation of white noise, FIG. 16*b* shows the simulated sequence attended speech$_{real}$, and finally FIG. 16*c* shows a visualization of the noise scaled by the factor that corresponds to a SNR of −20, thus the EEG$_{sim}$ obtained by adding together the two signals from (a) and (b) using SNR=−20.

From these signals, shown in FIG. 16*a-c*, a frame corresponding to the first 20 ms of the speech was extracted. As mentioned, the same procedure detailed in section 3.1 was used, a 20 ms frame was extracted from the signals, and the same PSD methods were considered: FFT using a Gaussian window, Periodogram, Periodogram with a Hanning window, Welch method, and Multitaper.

In a similar way as done in the previous section, the first 13 cepstral coefficients for each sequence were kept and then compared with each other using the NMSE and correlation $\rho$.

Figure 17A:
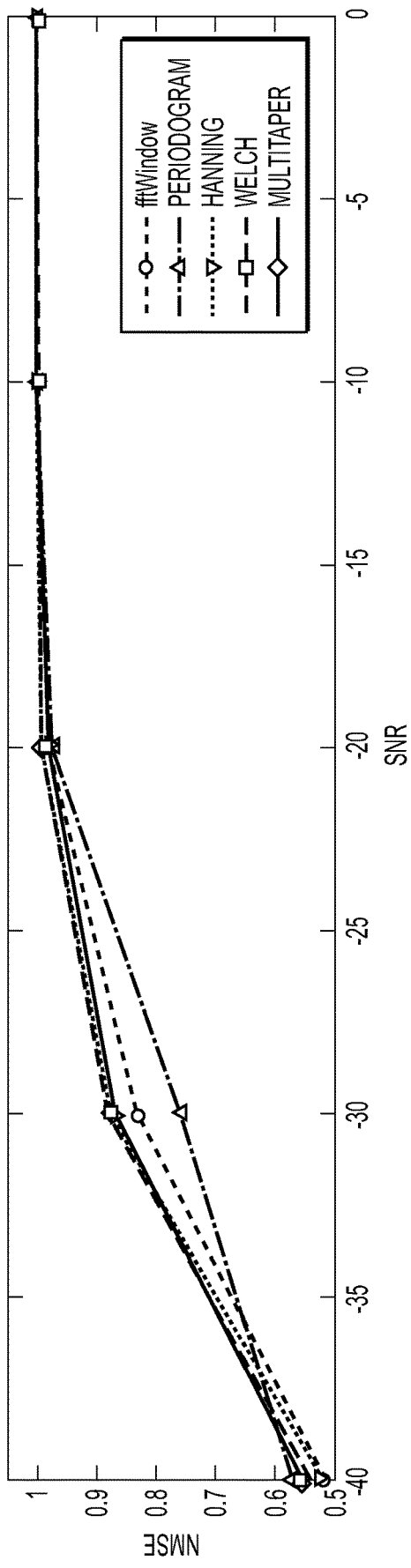
FIG. 17 a-b illustrates a graphical view of a simulation according to an embodiment of the disclosure.
Figure 17B:
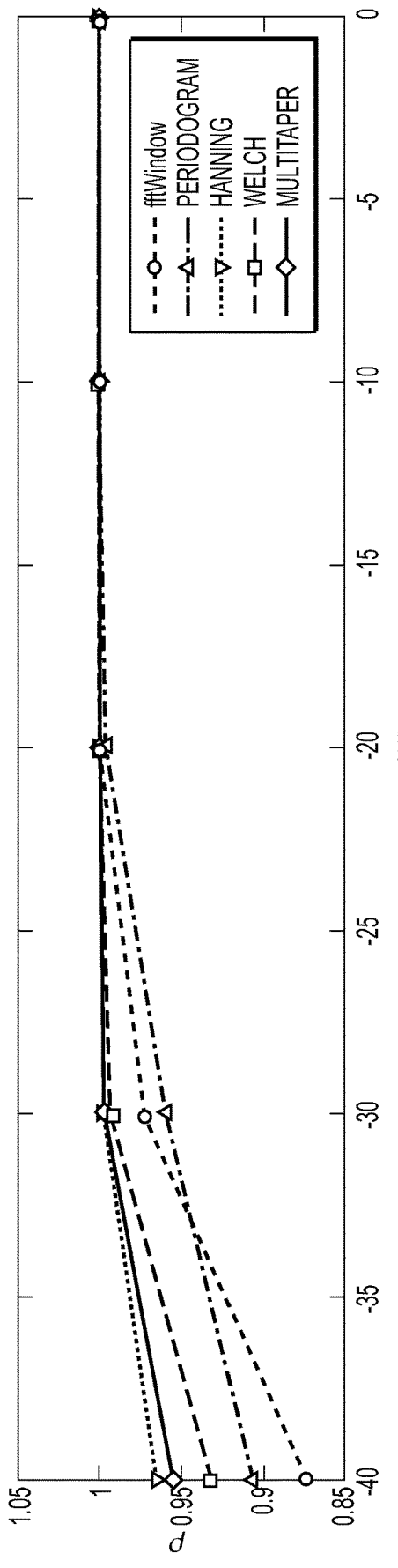

FIG. 17*a* shows the mean values of NMSE, and FIG. 17*b* shows the mean value of $\rho$ of the fit from the attended speech$_{real}$ cepstral coefficients and the EEG$_{sim1}$ (white noise) cepstral coefficients, using different PSDE methods. The x-axis shows SNR from −40 to 0.

TABLE 5.5

Mean values of NMSE for attended speech$_{real}$ and 10,000 realizations of EEG$_{sim1}$

| PSDE | SNR = −40 | SNR = −30 | SNR = −20 | SNR = −10 | SNR = 0 |
|---|---|---|---|---|---|
| FFT | 0.5149 | 0.8303 | 0.9808 | 0.9993 | 1.0000 |
| Periodogram | 0.5704 | 0.7598 | 0.9733 | 0.9993 | 1.0000 |
| Hanning | 0.5476 | 0.8672 | 0.9816 | 0.9993 | 1.0000 |
| Welch | 0.5204 | 0.8755 | 0.9943 | 1.0000 | 1.0000 |
| Multitaper | 0.5379 | 0.8787 | 0.9895 | 0.9999 | 1.0000 |

TABLE 5.6

Mean values of $\rho$ for attended speech$_{real}$ and 10,000 realizations of EEG$_{sim1}$

| PSDE | SNR = −40 | SNR = −30 | SNR = −20 | SNR = −10 | SNR = 0 |
|---|---|---|---|---|---|
| FFT | 0.8736 | 0.9725 | 0.9992 | 1.0000 | 1.0000 |
| Periodogram | 0.9045 | 0.9593 | 0.9947 | 0.9998 | 1.0000 |
| Hanning | 0.9644 | 0.9973 | 0.9999 | 1.0000 | 1.0000 |
| Welch | 0.9309 | 0.9923 | 0.9999 | 1.0000 | 1.0000 |
| Multitaper | 0.9551 | 0.9972 | 1.0000 | 0.9999 | 1.0000 |

Figure 18A:
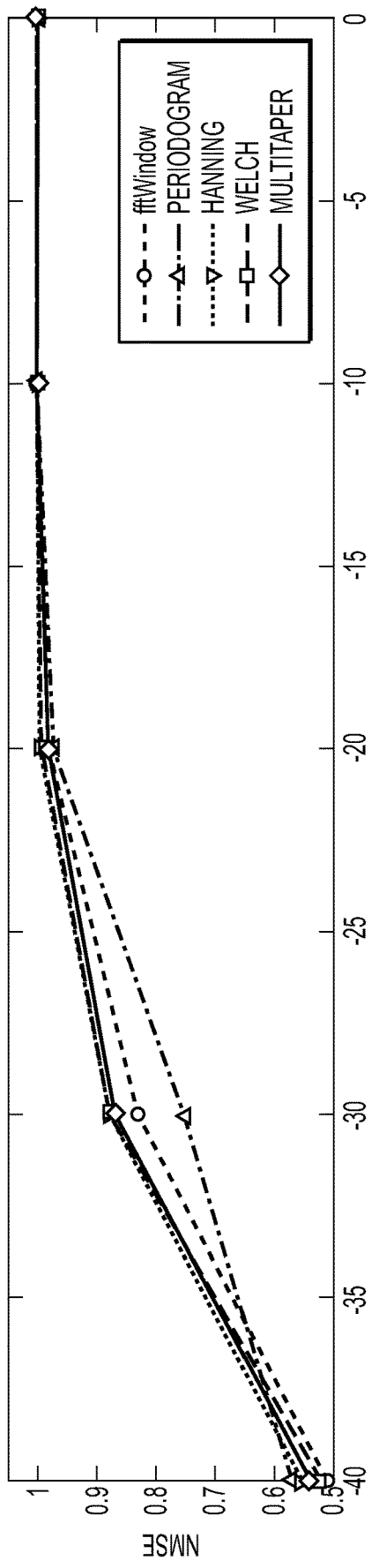
FIG. 18 a-b illustrates a graphical view of a simulation according to an embodiment of the disclosure.
Figure 18B:
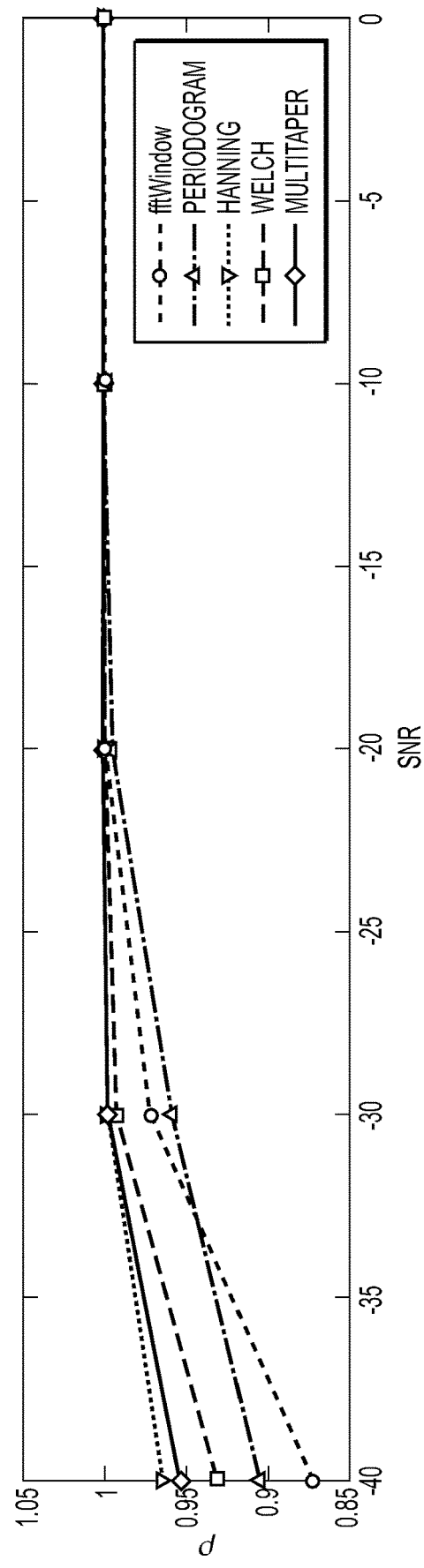

FIG. 18*a* shows the mean values of NMSE and FIG. 18*b* shows the mean values of $\rho$ of the fit from the attended speech$_{real}$ cepstral coefficients and the EEG$_{sim2}$ (white noise) cepstral coefficients, using different PSDE methods. The x-axis shows SNR from −40 to 0.

TABLE 5.7

Mean values of NMSE for attended speech$_{real}$ and 10,000 realizations of EEG$_{sim2}$

| PSDE | SNR = −40 | SNR = −30 | SNR = −20 | SNR = −10 | SNR = 0 |
|---|---|---|---|---|---|
| FFT | 0.5165 | 0.8301 | 0.9813 | 0.9992 | 1.0000 |
| Periodogram | 0.5699 | 0.7540 | 0.9728 | 0.9993 | 1.0000 |
| Hanning | 0.5503 | 0.8687 | 0.9821 | 0.9991 | 1.0000 |
| Welch | 0.5221 | 0.8764 | 0.9944 | 1.0000 | 1.0000 |
| Multitaper | 0.5393 | 0.8795 | 0.9896 | 0.9999 | 1.0000 |

TABLE 5.8

Mean values of ρ for attended speech$_{real}$
and 10,000 realizations of EEG$_{sim2}$

| PSDE | SNR = −40 | SNR = −30 | SNR = −20 | SNR = −10 | SNR = 0 |
|---|---|---|---|---|---|
| FFT | 0.8720 | 0.9716 | 0.9992 | 1.0000 | 1.0000 |
| Periodogram | 0.9049 | 0.9587 | 0.9945 | 0.9998 | 1.0000 |
| Hanning | 0.9642 | 0.9973 | 0.9999 | 1.0000 | 1.0000 |
| Welch | 0.9312 | 0.9924 | 0.9999 | 1.0000 | 1.0000 |
| Multitaper | 0.9550 | 0.9972 | 1.0000 | 1.0000 | 1.0000 |

Figure 19B:
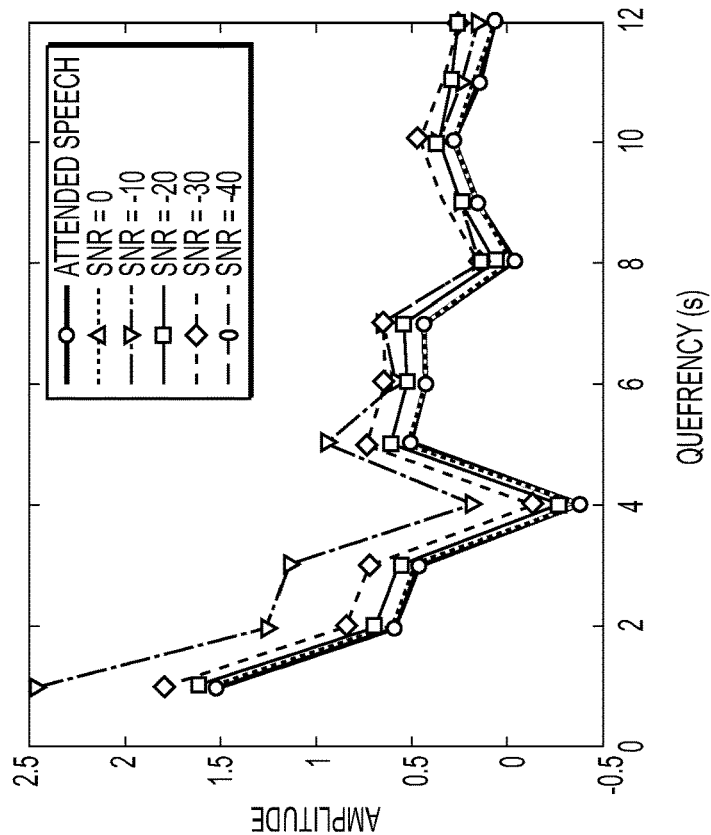
FIG. 19 a-b illustrates a graphical view of a simulation according to an embodiment of the disclosure.
Figure 19A:
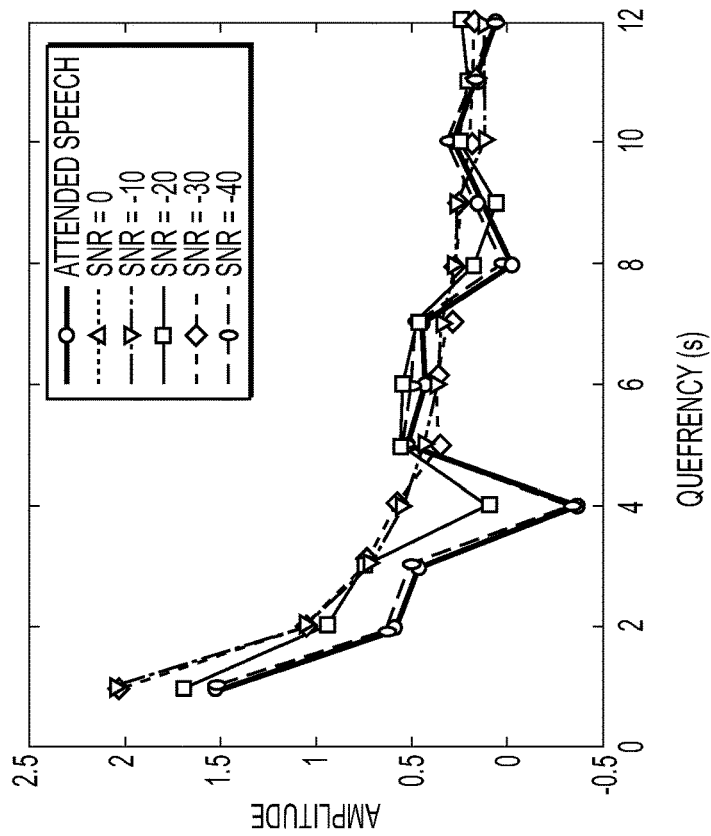

FIG. 19a-b shows the first 13 cepstral coefficients of the sequences: attended speech$_{sim}$ (shown in blue) and EEG$_{sim1}$ (dotted lines). For reference (in red) the cepstral coefficients for the "pure" noise were displayed. FIG. 19a corresponds to one realization using white noise and FIG. 19b to one realization using simulated background EEG.

From these graphs it can be seen how the gradient from attended speech$_{sim}$ coefficients follow the gradient from EEG$_{sim1}$ and EEG$_{sim2}$. It can be observed from tables 5.5 to 5.8, that when using real speech both the NMSE and the ρ values were higher compared to those obtained using simulated speech streams. Even for SNR levels of −30 (for both white noise and simulated background EEG) the NMSE values were above 0.8 (except for the Periodogram). For all the SNR considered in this exercise, the obtained p values were above 0.85.

5.3 Real Speech and Simulated EEG—Whole Sequence

Using the same methods as in sections 4.1 and 4.2 a single 20 ms frame were considered for each realization and not for the whole speech frame. This was to move closer to the next stage where two speech streams where to be compared, one attended and one unattended, with the simulated EEG.

The coefficients of a 20 ms frame of EEG$_{sim}$ were compared with those obtained from a 20 ms frame of attended speech and unattended speech streams respectively.

When looking at the level at which the SNR became too low, a the number of 20 ms frames for seen for which the cepstral coefficients from EEG$_{sim}$ would fit more closely to the cepstral coefficients of the attended speech than those of the unattended speech.

Continuing to work with real speech signals, now two different recordings of speech saying "Hola". The first speech stream that was recorded was of a female voice, which will be referred to as the attended speech. A second stream consisted of a recording of a male voice, which will be referred to as the unattended speech. Simulated noise was added to the attended speech to obtain a simulated EEG signal recording, EEG$_{sim}$. In this way 3 sequences were obtained:

1. Attended speech
2. Unattended speech
3. EEG$_{sim}$=attended speech+noise

The cepstral coefficients from a frame length 20 ms of the sequence EEG$_{sim}$ and compared them with the cepstral coefficient from frame length 20 ms of the sequence attended speech and unattended speech respectively.

The idea behind this exercise was to see how well for different levels of SNR the cepstral coefficients from EEGsim would fit the cepstral coefficients of the attended speech rather than the unattended speech.

Similarly, as in the previous section, two types of noise was considered:

$$EEG_{sim_1} = \text{attended speech} + \text{white noise} \quad (eq. 5.5)$$

$$EEG_{sim_2} = \text{attended speech} + \text{simulated background EEG} \quad (eq. 5.6)$$

The speech and EEG signals were broken into non-overlapping frames and the cepstral coefficients were calculated for each of these frames. Letting $CC_A(k,m)$, $CC_U(k,m)$, and $CC_E(k,m)$ indicate the set of m cepstral coefficients for the k-th frame of the attended, unattended speech, and EEG$_{sim}$ signals respectively, and writes as $$CC_A(k, m) = \begin{bmatrix} cc_a(1,1) & cc_a(2,1) & \ldots & cc_a(k,1) \\ cc_a(1,2) & cc_a(2,2) & \ldots & cc_a(k,2) \\ \vdots & \vdots & \ddots & \vdots \\ cc_a(1,m) & cc_a(2,m) & \ldots & cc_a(k,m) \end{bmatrix} \quad (eq. 5.7)$$

$$CC_U(k, m) = \begin{bmatrix} cc_u(1,1) & cc_u(2,1) & \ldots & cc_u(k,1) \\ cc_u(1,2) & cc_u(2,2) & \ldots & cc_u(k,2) \\ \vdots & \vdots & \ddots & \vdots \\ cc_u(1,m) & cc_u(2,m) & \ldots & cc_u(k,m) \end{bmatrix} \quad (eq. 5.8)$$

$$CC_E(k, m) = \begin{bmatrix} cc_e(1,1) & cc_e(2,1) & \ldots & cc_e(N,1) \\ cc_e(1,2) & cc_e(2,2) & \ldots & cc_e(N,2) \\ \vdots & \vdots & \ddots & \vdots \\ cc_e(1,M) & cc_e(2,M) & \ldots & cc_e(N,M) \end{bmatrix} \quad (eq. 5.9)$$

Each of these sets of m cepstral coefficients were then stacked into column vectors of length km in order to consider them as time points $$CC_A(km) = \begin{bmatrix} cc_a(1,1) \\ cc_a(2,1) \\ \vdots \\ cc_a(k,1) \\ cc_a(1,2) \\ cc_a(2,2) \\ \vdots \\ cc_a(k,2) \\ \vdots \\ cc_a(1,m) \\ cc_a(2,m) \\ \vdots \\ cc_a(k,m) \end{bmatrix}, \quad CC_U(km) = \begin{bmatrix} cc_u(1,1) \\ cc_u(2,1) \\ \vdots \\ cc_u(k,1) \\ cc_u(1,2) \\ cc_u(2,2) \\ \vdots \\ cc_u(k,2) \\ \vdots \\ cc_u(1,m) \\ cc_u(2,m) \\ \vdots \\ cc_u(k,m) \end{bmatrix}, \quad (eq. 5.10)$$

and $$CC_E(km) = \begin{bmatrix} cc_e(1,1) \\ cc_e(2,1) \\ \vdots \\ cc_e(k,1) \\ cc_e(1,2) \\ cc_e(2,2) \\ \vdots \\ cc_e(k,2) \\ \vdots \\ cc_e(1,m) \\ cc_e(2,m) \\ \vdots \\ cc_e(k,m) \end{bmatrix},$$

The NMSE and Pearson's ρ values were calculated between the simulated EEG and the attended and unattended speech streams respectively, for each of the cepstral coefficients of each respective frame. These NMSE and ρ values were used to determine if the sequence $CC_E(km)$ was a better fit to sequence $CC_A(km)$ or to sequence $CC_U(km)$. If the NMSE and ρ between $CC_E(km)$ and $CC_A(km)$ were higher than the NMSE and ρ between $CC_E(km)$ and $CC_U(km)$, then it could be concluded that $EEG_{sim}$ was closer to the attended speech. This procedure was carried out with 10,000 respective realizations of $EEG_{sim1}$ and $EEG_{sim2}$ to determine how well the simulated EEG was following the attended speech.

TABLE 5.9

Mean values of NMSE for attended speech$_{real}$ and 10,000 realizations of $EEG_{sim1}$.

| PSDE | SNR = −40 | SNR = −30 | SNR = −20 | SNR = −10 | SNR = 0 |
|---|---|---|---|---|---|
| FFT | 0.1780 | 0.2298 | 0.4916 | 0.8541 | 0.9773 |
| Periodogram | 0.6414 | 0.6427 | 0.6842 | 0.8633 | 0.9795 |
| Hanning | — | — | 0.3111 | 0.8478 | 0.9776 |
| Welch | 0.4591 | 0.4666 | 0.6267 | 0.9102 | 0.9940 |
| Multitaper | — | — | 0.3960 | 0.8777 | 0.9842 |

TABLE 5.10

Mean values of NMSE for unattended speech$_{real}$ and 10,000 realizations of $EEG_{sim1}$.

| PSDE | SNR = −40 | SNR = −30 | SNR = −20 | SNR = −10 | SNR = 0 |
|---|---|---|---|---|---|
| FFT | 0.4763 | 0.5044 | 0.6242 | 0.7173 | 0.7118 |
| Periodogram | 0.7060 | 0.7037 | 0.7201 | 0.7444 | 0.7335 |
| Hanning | — | 0.0026 | 0.5203 | 0.7049 | 0.7033 |
| Welch | 0.6806 | 0.6839 | 0.7439 | 0.8064 | 0.7894 |
| Multitaper | — | 0.0636 | 0.5522 | 0.7221 | 0.7204 |

TABLE 5.11

Mean values of ρ for attended speech$_{real}$ and 10,000 realizations of $EEG_{sim1}$.

| PSDE | SNR = −40 | SNR = −30 | SNR = −20 | SNR = −10 | SNR = 0 |
|---|---|---|---|---|---|
| FFT | 0.6883 | 0.7101 | 0.8153 | 0.9427 | 0.9893 |
| Periodogram | 0.8142 | 0.8150 | 0.8390 | 0.9342 | 0.9903 |
| Hanning | 0.5939 | 0.6942 | 0.8366 | 0.9460 | 0.9895 |
| Welch | 0.8494 | 0.8517 | 0.8964 | 0.9685 | 0.9972 |
| Multitaper | 0.5980 | 0.7026 | 0.8535 | 0.9557 | 0.9926 |

TABLE 5.12

Mean values of ρ for unattended speech$_{real}$ and 10,000 realizations of $EEG_{sim1}$.

| PSDE | SNR = −40 | SNR = −30 | SNR = −20 | SNR = −10 | SNR = 0 |
|---|---|---|---|---|---|
| FFT | 0.7414 | 0.7559 | 0.8143 | 0.8490 | 0.8461 |
| Periodogram | 0.8542 | 0.8546 | 0.8635 | 0.8800 | 0.8772 |
| Hanning | 0.6116 | 0.6810 | 0.7826 | 0.8398 | 0.8450 |
| Welch | 0.8437 | 0.8452 | 0.8706 | 0.9001 | 0.9023 |
| Multitaper | 0.6071 | 0.6866 | 0.7950 | 0.8499 | 0.8561 |

TABLE 5.13

Mean values of NMSE for attended speech$_{real}$ and 10,000 realizations of $EEG_{sim2}$.

| PSDE | SNR = −40 | SNR = −30 | SNR = −20 | SNR = −10 | SNR = 0 |
|---|---|---|---|---|---|
| FFT | 0.3944 | 0.5759 | 0.8809 | 0.9905 | 0.9997 |
| Periodogram | 0.6195 | 0.6509 | 0.8262 | 0.9742 | 0.9986 |
| Hanning | — | 0.5076 | 0.8900 | 0.9917 | 0.9998 |
| Welch | 0.1934 | 0.4873 | 0.8760 | 0.9954 | 1.0000 |
| Multitaper | 0.0002 | 0.5078 | 0.8904 | 0.9941 | 0.9999 |

TABLE 5.14

Mean values of NMSE for unattended speech$_{real}$ and 10,000 realizations of $EEG_{sim2}$.

| PSDE | SNR = −40 | SNR = −30 | SNR = −20 | SNR = −10 | SNR = 0 |
|---|---|---|---|---|---|
| FFT | 0.5214 | 0.6092 | 0.7179 | 0.7124 | 0.7045 |
| Periodogram | 0.6716 | 0.6876 | 0.7440 | 0.7367 | 0.7304 |
| Hanning | 0.3142 | 0.5947 | 0.7027 | 0.6995 | 0.6891 |
| Welch | 0.6543 | 0.7196 | 0.7968 | 0.7904 | 0.7808 |
| Multitaper | 0.3442 | 0.6052 | 0.7221 | 0.7202 | 0.7102 |

TABLE 5.15

Mean values of ρ for attended speech$_{real}$ and 10,000 realizations of $EEG_{sim2}$.

| PSDE | SNR = −40 | SNR = −30 | SNR = −20 | SNR = −10 | SNR = 0 |
|---|---|---|---|---|---|
| FFT | 0.7483 | 0.8459 | 0.9642 | 0.9963 | 0.9999 |
| Periodogram | 0.8561 | 0.8729 | 0.9353 | 0.9880 | 0.9993 |
| Hanning | 0.7921 | 0.9141 | 0.9769 | 0.9970 | 0.9999 |
| Welch | 0.8932 | 0.9320 | 0.9769 | 0.9984 | 1.0000 |
| Multitaper | 0.7847 | 0.9165 | 0.9785 | 0.9978 | 1.0000 |

TABLE 5.16

Mean values of ρ for unattended speech$_{real}$ and 10,000 realizations of $EEG_{sim2}$.

| PSDE | SNR = −40 | SNR = −30 | SNR = −20 | SNR = −10 | SNR = 0 |
|---|---|---|---|---|---|
| FFT | 0.7863 | 0.8299 | 0.8578 | 0.8447 | 0.8418 |
| Periodogram | 0.8937 | 0.8965 | 0.8803 | 0.8733 | 0.8722 |
| Hanning | 0.7712 | 0.8293 | 0.8453 | 0.8412 | 0.8377 |
| Welch | 0.8949 | 0.8969 | 0.8990 | 0.9007 | 0.8986 |
| Multitaper | 0.7654 | 0.8375 | 0.8557 | 0.8539 | 0.8508 |

6. Results

A description and a summary of the obtained results when Stimulus-reconstruction using cepstral coefficients was tried on real data follows. A first setup using certain specifications was needed. This due to the demand in computational time and power. In order to assess which combination of length frame, channels, and number of cepstral coefficients might be the optimal one. The aim was to obtain the highest classification rates using the less amount of data in the most efficient possible way. Above it was noticed that Welch method might be a suitable first option for PSD estimation. This was the method that was used for the first setup. After having a better image of which was the best setup combination the Periodogram with a Hanning window was used for PSD estimation. The obtained results were very similar.

6.1 Initial Setup

An initial setup was chosen since the computation times were too long and complicated to run the model for all possible combinations. The first setup that was used consisted of estimating the PSD using Welch method, for different length frames: 25, 50, and 75. EEG recordings from a set of 9 channels were considered: A1, A19, A23, B22, B26, C17, C21, D18, D23. Cepstral coefficients were obtained for these different lengths' frames. As was done for the simulations in chapter 3, the first coefficient $m_0$ was discarded keeping different number of coefficients up to $m_5$, $m_7$, $m_{11}$, and $m_{13}$.

Channels A1, A19, A23, B22, B26, C17, C21, D18, and D23 were selected as a first set for the initial setup.

TABLE 6.1

Decoding accuracy using NMSE, mean of NMSE and standard deviation (in parentheses) for both attended and unattended speeches.

| Frame length | $c_m$ | Decoding Accuracy (%) | NMSE$_{attended}$ | | NMSE$_{unattended}$ | |
|---|---|---|---|---|---|---|
| 25 | $c_6$ | 94.52 | 0.362 | (0.009) | 0.2561 | (0.015) |
|  | $c_8$ | 92.47 | 0.4190 | (0.01) | 0.3152 | (0.016) |
|  | $c_{11}$ | 95.48 | 0.4544 | (0.003) | 0.3560 | (0.008) |
|  | $c_{14}$ | 96.34 | 0.4893 | (0.005) | 0.3993 | (0.002) |
| 50 | $c_6$ | 93.55 | 0.3513 | (0.015) | 0.2331 | (0.021) |
|  | $c_8$ | 91.61 | 0.3935 | (0.016) | 0.2838 | (0.023) |
|  | $c_{11}$ | 94.52 | 0.4157 | (0.012) | 0.3052 | (0.018) |
|  | $c_{14}$ | 53.66 | 0.3673 | (0.049) | 0.3318 | (0.047) |
| 75 | $c_6$ | 94.09 | 0.3515 | (0.015) | 0.2276 | (0.02) |
|  | $c_8$ | 91.94 | 0.3910 | (0.016) | 0.2771 | (0.021) |
|  | $c_{11}$ | 54.62 | 0.3181 | (0.054) | 0.2824 | (0.051) |
|  | $c_{14}$ | 53.66 | 0.3504 | (0.047) | 0.3262 | (0.047) |

TABLE 6.2

Decoding accuracy using $\rho$, mean of $\rho$ and standard deviation (in parentheses) for both attended and unattended speeches.

| Frame length | $c_m$ | Decoding Accuracy (%) | $\rho_{attended}$ | | $\rho_{unattended}$ | |
|---|---|---|---|---|---|---|
| 25 | $c_6$ | 94.73 | 0.6078 | (0.006) | 0.5267 | (0.006) |
|  | $c_8$ | 91.94 | 0.6494 | (0.007) | 0.5841 | (0.007) |
|  | $c_{11}$ | 93.12 | 0.6759 | (0.002) | 0.6161 | (0.002) |
|  | $c_{14}$ | 92.80 | 0.7010 | (0.003) | 0.6475 | (0.003) |
| 50 | $c_6$ | 94.52 | 0.5946 | (0.01) | 0.5008 | (0.01) |
|  | $c_8$ | 91.83 | 0.6288 | (0.011) | 0.5516 | (0.011) |
|  | $c_{11}$ | 93.44 | 0.6461 | (0.008) | 0.5713 | (0.008) |
|  | $c_{14}$ | 53.66 | 0.6061 | (0.039) | 0.5896 | (0.039) |
| 75 | $c_6$ | 95.05 | 0.5946 | (0.01) | 0.4952 | (0.01) |
|  | $c_8$ | 91.94 | 0.6266 | (0.01) | 0.5441 | (0.01) |
|  | $c_{11}$ | 53.66 | 0.5635 | (0.044) | 0.5426 | (0.044) |
|  | $c_{14}$ | 53.66 | 0.5917 | (0.04) | 0.5834 | (0.04) |

Note that the number of coefficients that are kept are m−1, as coefficient $m_0$ is ignored as it corresponds to an impulse at zero.

The setup for Stimulus-reconstruction model using cepstral coefficients that was decided to keep for further analyses was the one using a frame of 25 ms length and keeping the first 13 cepstral coefficients (this excluding the first impulse $m_0$). The next step was to try sets using different number of channels. The first one was using all 128 channels to see if there was a significant improvement in the results. After performing this, a reduced number of channels were tried to be used, in this case using only 3 channels. Results and further details for these other tests will be discussed in the following sections.

6.2 Using 25 ms Frames and 13 Cepstral Coefficients

The next step after deciding the setup for the stimulus-reconstruction using the cepstral coefficients model was to verify if decoding accuracy results and/or NMSE or $\rho$ could be improved. This was done by running the model using EEG data from all 128 channels. Results obtained using 128 channels were not significantly different from the ones obtained using 9 channels (see Tables 6.3 and 6.4). The next step was then to run the model with a further reduced number of channels, namely 3 channels. Results and selection of channels are discussed in this section.

Figure 20A:
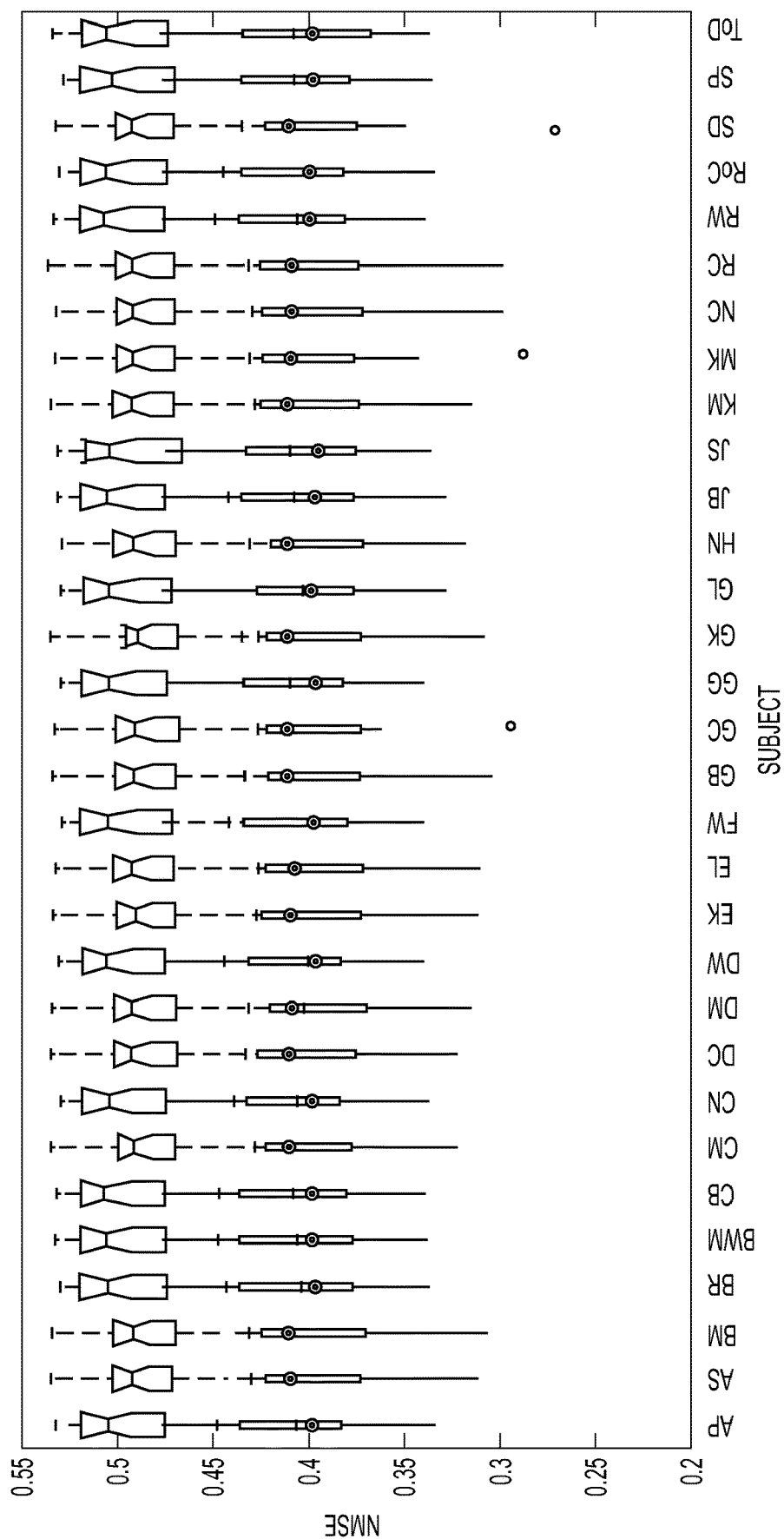
FIG. 20 a-b illustrates a box plot of a simulation according to an embodiment of the disclosure.
Figure 20B:
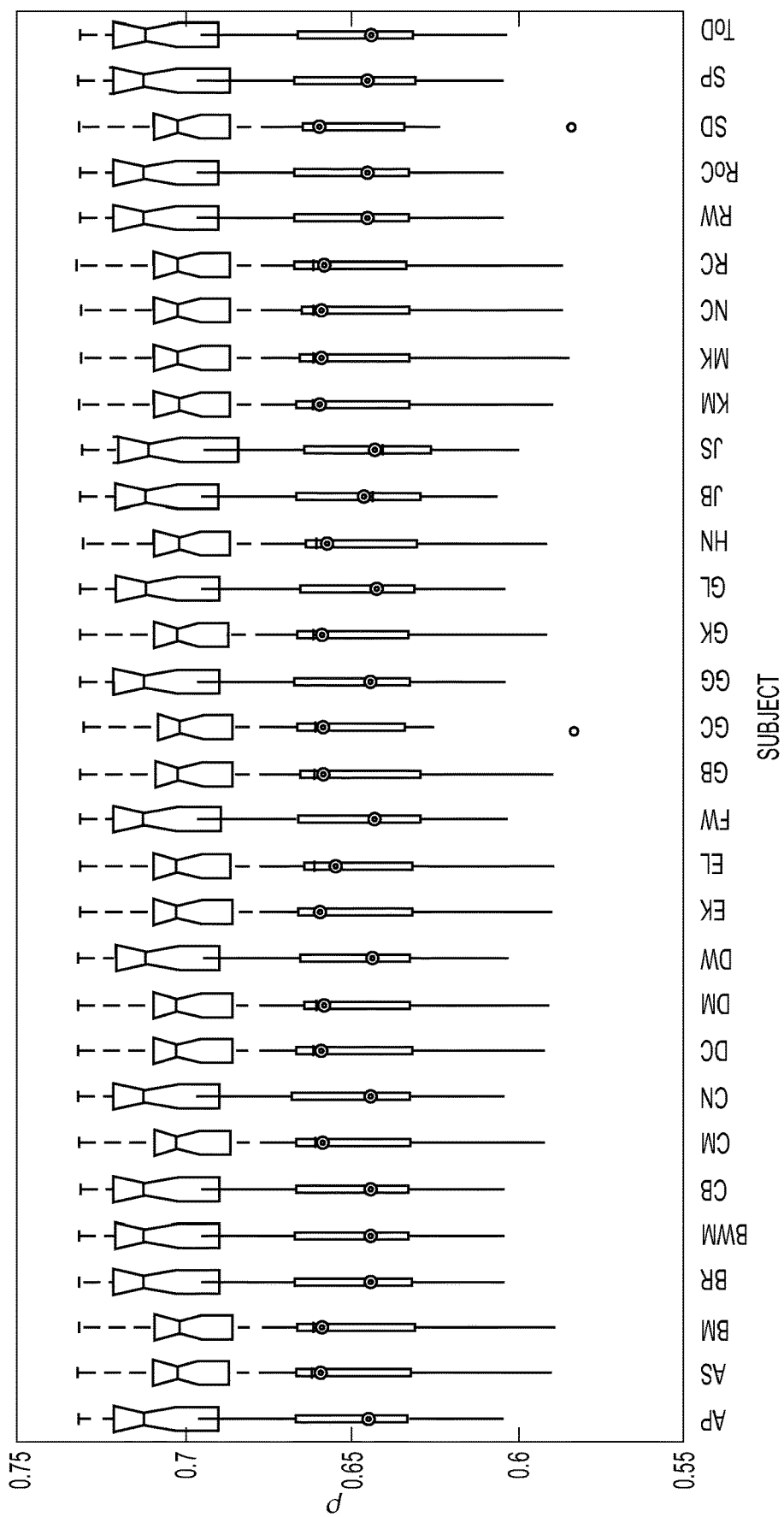

FIG. 20 *a-b* shows box plot of NMSE and $\rho$ for both attended (shown bottle shaped marks) and unattended (shown in bold black line) speeches.

TABLE 6.3

Decoding accuracy using NMSE, mean of NMSE and standard deviation (in parentheses) for both attended and unattended speeches. Result for selected setup using different sets of channels.

| Channels | Decoding Accuracy (%) | NMSE$_{attended}$ | | NMSE$_{unattended}$ | |
|---|---|---|---|---|---|
| 128 channels | 96.13 | 0.4901 | (0.005) | 0.4002 | (0.002) |
| 9 channels | 96.34 | 0.4893 | (0.005) | 0.3993 | (0.002) |
| 3 channels | 96.13 | 0.4870 | (0.006) | 0.3968 | (0.003) |

TABLE 6.4

Decoding accuracy using $\rho$, mean of $\rho$ and standard deviation (in parentheses) for both attended and unattended speeches. Result for selected setup using different sets of channels.

| Channels | Decoding Accuracy (%) | $\rho_{attended}$ | | $\rho_{unattended}$ | |
|---|---|---|---|---|---|
| 128 channels | 93.12 | 0.7013 | (0.003) | 0.6479 | (0.003) |
| 9 channels | 92.80 | 0.7010 | (0.003) | 0.6475 | (0.003) |
| 3 channels | 92.26 | 0.6996 | (0.004) | 0.6462 | (0.003) |

Scattered plots for both NMSE and $\rho$ was obtained from the model using 3 channels for all subjects and all trials, not shown. From these plots we can see that most of the obtained values for both measures, NMSE and $\rho$ using the attended speech, are greater than the ones using unattended speech. Table 6.5 contains the medians for both attended and unattended speeches using these 3 channels and the mentioned set up.

TABLE 6.5

Median values of NMSE and $\rho$ for both attended and unattended speeches.

| Measure | Attended | unattended |
|---|---|---|
| NMSE | 0.4855 | 0.3968 |
| $\rho$ | 0.6976 | 0.6440 |

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other elements, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.
10 Sound processing unit
101 Sound pre-processing unit
11 sound input signals
12 EEG input signal
13 EEG cepstrum
14 Sound cepstrum
15 microphone/s
16 selected sound stream/signals
17 segmented sound stream/signals
18 attended sound signals
20 Selection unit
21 Speech cepstrum calculation unit
22 mapping unit
23 Correlation unit
30 Estimation unit
40 EEG ceptrum calculation unit
401 EEG pre-processing unit

The invention claimed is:

1. A speech classification apparatus for hearing devices with electroencephalography (EEG) dependent sound processing, comprising:
a sound processing unit configured to capture sound input signals from at least one external microphone and segmenting said captured sound input signals into segmented sound signals;
a speech classification unit comprising:
a sound cepstrum calculation unit configured to calculate a sound cepstrum for each segmented sound signal,
an EEG cepstrum calculation unit configured to calculate an EEG cepstrum for an EEG signal of a user's brain,
a mapping unit configured to select a predetermined number of coefficients from each calculated sound cepstrum and from the calculated EEG cepstrum, and
a correlation unit configured to calculate a correlation value for each segmented sound signal based on a correlation of the predetermined number of selected coefficients from the respective calculated sound cepstrum with the predetermined number of selected coefficients from the calculated EEG cepstrum,
wherein an attended speech source is classified based on the calculated correlation values.

2. The speech classification apparatus according to claim 1,
wherein the EEG signal is provided by an EEG device configured to record an activity of an auditory part of the user's brain.

3. The speech classification apparatus according to claim 2,
wherein the sound cepstrum calculation unit is configured to calculate the cepstrum of each segmented sound signal by calculating a real number of an inverse Fourier transform of a logarithmized power spectrum of the segmented sound signal, and the EEG cepstrum calculation unit is configured to calculate the EEG cepstrum of the EEG signal by calculating a real number of an inverse Fourier transform of a logarithmized power spectrum of the EEG signal.

4. The speech classification apparatus according to claim 2,
wherein the sound processing unit comprises a pre-processing unit, and the pre-processing unit of the sound processing unit is configured to delay each of the sound input signals by a predetermined time, or
wherein the EEG cepstrum calculation unit comprises a pre-processing unit, and the pre-processing unit of the EEG cepstrum calculation unit is configured to delay the EEG signal by a predetermined time.

5. The speech classification apparatus according to claim 2,
wherein the correlation unit is configured to calculate the correlation value for each segmented sound signal using a linear regression method, a non-linear regression method, or using a neural network.

6. The speech classification apparatus according to claim 1,
wherein the sound cepstrum calculation unit is configured to calculate the cepstrum of each segmented sound signal by calculating a real number of an inverse Fourier transform of a logarithmized power spectrum of the segmented sound signal, and the EEG cepstrum calculation unit is configured to calculate the EEG cepstrum of the EEG signal by calculating a real number of an inverse Fourier transform of a logarithmized power spectrum of the EEG signal.

7. The speech classification apparatus according to claim 6,
wherein the sound processing unit comprises a pre-processing unit, and the pre-processing unit of the sound processing unit is configured to delay each of the sound input signals by a predetermined time, or
wherein the EEG cepstrum calculation unit comprises a pre-processing unit, and the pre-processing unit of the EEG cepstrum calculation unit is configured to delay the EEG signal by a predetermined time.

8. The speech classification apparatus according to claim 6,
wherein the correlation unit is configured to calculate the correlation value for each segmented sound signal using a linear regression method, a non-linear regression method, or using a neural network.

9. The speech classification apparatus according to claim 1,
wherein the sound processing unit comprises a pre-processing unit, and the pre-processing unit of the sound processing unit is configured to delay each of the sound input signals by a predetermined time, or wherein the EEG cepstrum calculation unit comprises a pre-processing unit, and the pre-processing unit of the EEG cepstrum calculation unit is configured to delay the EEG signal by a predetermined time.

10. The speech classification apparatus according to claim 1,
wherein the correlation unit is configured to calculate the correlation value for each segmented sound signal using a linear regression method, a non-linear regression method, or using a neural network.

11. The speech classification apparatus according to claim 1,
wherein the correlation unit is configured to identify a selected sound signal, which the user is listening to, based on the correlation values calculated by the correlation unit for the segmented sound signals.

12. A hearing assistance system with electroencephalography (EEG) dependent sound processing, comprising
a hearing device adapted for being located at or in an ear or for being fully or partially implanted in the head of a user,
the hearing device comprises an output unit for providing output stimuli perceivable by the user as sound,
wherein the hearing device comprises the speech classification apparatus according to claim 1,
the hearing device is configured to provide the EEG signal by at least one EEG electrode, and
the output stimuli are based on the correlation values calculated by the correlation unit.

13. The hearing assistance system according to claim 12,
wherein the hearing device comprises a hearing aid, a headset, an earphone, an ear protection device, a speakerphone or a combination thereof.

14. The hearing assistance system according to claim 12,
wherein the hearing device is one of a first hearing device and a second hearing device,
wherein the hearing assistance system is configured to exchange information between the first and second hearing devices or between the first and second hearing devices and an auxiliary device.

15. A speech classification method for hearing devices with electroencephalography (EEG) dependent sound processing, comprising:
capturing one or more sound signals from at least one external microphone and segmenting said captured one or more sound signals into segmented sound signals;
capturing an EEG signal of a user's brain;
calculating a sound cepstrum for each segmented sound signal and an EEG cepstrum for the captured EEG signal,
selecting a predetermined number of coefficients from each calculated sound cepstrum and from the calculated EEG cepstrum, and
calculating a correlation value for each segmented sound signal based on a correlation of the predetermined number of selected coefficients from the respective calculated sound cepstrum with the predetermined number of coefficients selected from the calculated EEG cepstrum,
classifying an attended speech source based on the calculated correlation values.

16. The speech classification method according to claim 15,
wherein the EEG signal is provided by an EEG device configured to record an activity of an auditory part of the user's brain.

17. The speech classification method according to claim 15, wherein
for each of the segmented sound signals, the sound cepstrum is calculated by calculating a real number of an inverse Fourier transform of a logarithmized power spectrum of the corresponding segmented sound signal, and
the EEG cepstrum is calculated by calculating a real number of an inverse Fourier transform of a logarithmized power spectrum of the captured EEG signal.

18. The speech classification method according to claim 15, further comprising:
pre-processing, performed before cepstrum calculation, comprising delaying the segmented sound signals by a predetermined time, or delaying the captured EEG signal by a predetermined time.

19. The method according to claim 15,
wherein the correlation value calculated for each segmented sound signal is calculated using a linear regression method, a non-linear regression method, or using a neural network.

20. The method according to claim 15, wherein the method further comprises:
identifying a selected sound input signal, which the user is listening to, based on the correlation values calculated for the segmented sound signals.

* * * * *